US011596168B2

(12) United States Patent
Savage et al.

(10) Patent No.: US 11,596,168 B2
(45) Date of Patent: Mar. 7, 2023

(54) MODULAR NUT CLEANING PLANT

(71) Applicant: Savage Equipment Incorporated, Madill, OK (US)

(72) Inventors: Basil W. Savage, Madill, OK (US); Steven W. Savage, Madill, OK (US); William Wagoner, Madill, OK (US)

(73) Assignee: Savage Equipment Incorporated, Madill, OK (US)

( * ) Notice: Subject to any disclaimer, the term of this patent is extended or adjusted under 35 U.S.C. 154(b) by 25 days.

(21) Appl. No.: 16/646,517

(22) PCT Filed: Sep. 19, 2018

(86) PCT No.: PCT/US2018/051762
§ 371 (c)(1),
(2) Date: Mar. 11, 2020

(87) PCT Pub. No.: WO2019/060423
PCT Pub. Date: Mar. 28, 2019

(65) Prior Publication Data
US 2020/0288764 A1    Sep. 17, 2020

Related U.S. Application Data

(60) Provisional application No. 62/560,516, filed on Sep. 19, 2017.

(51) Int. Cl.
*A23N 5/00* (2006.01)
*B07B 1/22* (2006.01)
(Continued)

(52) U.S. Cl.
CPC ............ *A23N 12/005* (2013.01); *A23N 5/00* (2013.01); *B07B 1/24* (2013.01); *B07B 4/08* (2013.01);
(Continued)

(58) Field of Classification Search
CPC .... B07B 4/08; B07B 1/24; B07B 1/22; B07B 2201/04; B07B 9/00; B07B 1/10;
(Continued)

(56) References Cited

U.S. PATENT DOCUMENTS 1,185,770 A * 6/1916 Cody ........................ B07B 1/22
209/393
1,564,914 A * 12/1925 Vaughan ................ A23N 5/008
99/581
(Continued)

FOREIGN PATENT DOCUMENTS

CN      105251694 A      1/2016
KR    20140070038 A *    11/2012
(Continued)

OTHER PUBLICATIONS

International Search Report and Written Opinion dated Jan. 16, 2019, issued in corresponding PCT Application No. PCT/US2018/051762.
(Continued)

*Primary Examiner* — Gene O Crawford
*Assistant Examiner* — Muhammad Awais
(74) *Attorney, Agent, or Firm* — McAfee & Taft

(57) ABSTRACT

A modular nut cleaning plant comprises a nut sizer and a stick remover mounted to the nut sizer. A vacuum unit is mounted to the stick remover. A nut product stream will pass on the stick remover through the vacuum unit which will vacuum light debris from the nut product stream. The nut product stream moves on a chain on the stick remover. Large debris and sticks that do not fall through openings in the chain will pass into a debris conveyor. Nuts and debris that fall through the openings in the chain will be delivered to the nut sizer. The nut sizer will rotate and tumble nuts and debris in the nut product stream. Nuts of an undesirable size and
(Continued)

debris will pass into a debris conveyor. Nuts of a desired size will pass through the nut sizer into a chute or other conveyance to be delivered to further nut processing apparatus.

16 Claims, 23 Drawing Sheets

(51) Int. Cl.
| | |
|---|---|
| *B07B 15/00* | (2006.01) |
| *A23N 12/00* | (2006.01) |
| *B07B 1/24* | (2006.01) |
| *G01B 3/34* | (2006.01) |
| *B07B 4/08* | (2006.01) |
| *B07B 1/10* | (2006.01) |
| *B07B 9/00* | (2006.01) |
| *B07B 1/52* | (2006.01) |

(52) U.S. Cl.
CPC ............ *G01B 3/34* (2013.01); *B07B 1/10* (2013.01); *B07B 1/22* (2013.01); *B07B 1/526* (2013.01); *B07B 9/00* (2013.01); *B07B 15/00* (2013.01); *B07B 2201/04* (2013.01)

(58) Field of Classification Search
CPC ........... B07B 15/00; B07B 1/18; B07B 13/04; B07B 1/288; A23N 12/005; A23N 5/00; G01B 3/34; Y02A 40/90
USPC ....... 209/288, 289, 270, 290, 291, 292, 311, 209/44
See application file for complete search history.

(56) References Cited

U.S. PATENT DOCUMENTS

| | | | |
|---|---|---|---|
| 1,948,606 A | 2/1934 | Weinig | |
| 2,100,738 A * | 11/1937 | Frevert | .................. B07B 4/025 209/30 |
| 2,161,032 A | 6/1939 | Formway | |
| 2,669,268 A | 2/1954 | Meyer | |
| 3,007,576 A * | 11/1961 | Hannaford | ................ B07B 1/24 209/288 |
| 3,341,877 A * | 9/1967 | Ingalls | ..................... A23N 5/01 15/305 |
| 3,428,172 A | 2/1969 | Hoffman | |
| 3,462,929 A * | 8/1969 | Ingalls | ................. A01D 51/002 236/68 B |
| 3,596,716 A | 8/1971 | Hoffman | |
| 3,672,504 A | 6/1972 | Grimes, Jr. | |
| 3,782,477 A | 1/1974 | Fahrenholz | |
| 4,205,882 A | 6/1980 | Hauschopp et al. | |
| 4,673,502 A | 6/1987 | Fox | |
| 4,702,826 A | 10/1987 | Pogue | |
| 5,248,042 A * | 9/1993 | Kuhmonen | ............. B07B 1/524 209/393 |
| 5,329,845 A | 7/1994 | Bichel | |
| 5,467,700 A | 11/1995 | Dowell et al. | |
| 5,485,924 A | 1/1996 | Zaun | |
| 5,507,396 A | 4/1996 | Hauch | |
| 6,360,894 B1 * | 3/2002 | Devlin | ...................... B07B 1/22 209/291 |
| 6,584,890 B1 | 7/2003 | Quantz et al. | |
| 6,609,617 B1 | 8/2003 | Slayer et al. | |
| 6,824,804 B2 | 11/2004 | Broyles et al. | |
| 6,843,376 B2 * | 1/2005 | Dube | ........................ B07B 9/00 209/234 |
| 6,941,859 B2 | 9/2005 | Trujillo | |
| 7,302,886 B2 | 12/2007 | Hamilton | |
| 7,444,929 B1 | 11/2008 | Savage | |
| 9,027,319 B1 * | 5/2015 | Di Anna | ................ A01D 51/00 56/328.1 |
| 9,730,380 B2 | 8/2017 | Nilson | |
| 10,300,508 B2 | 5/2019 | Eberts et al. | |
| 11,020,769 B2 | 6/2021 | Savage | |
| 2005/0045050 A1 | 3/2005 | Broyles et al. | |
| 2009/0293741 A1 | 12/2009 | Reiff et al. | |
| 2010/0078366 A1 | 4/2010 | Wark | |
| 2016/0368025 A1 * | 12/2016 | Cappozzo | ............... B08B 15/02 |
| 2018/0117632 A1 | 5/2018 | Savage | |

FOREIGN PATENT DOCUMENTS

| | | | |
|---|---|---|---|
| KR | 20140070038 A * | 6/2014 | |
| KR | 20140070038 A | 6/2014 | |

OTHER PUBLICATIONS

International Search Report and Written Opinion dated Jan. 4, 2019, issued in PCT Application No. PCT/US2018/051778.
International Search Report and Written Opinion dated Jan. 24, 2019, issued in PCT Application No. PCT/US2018/051805.
Images of prior art nut sorter (undated but admitted to be prior art).
United States Department of Agriculture, Agricultural Marketing Service, Fruit and Vegetable Division, Fresh Products Branch, "Pecans in the Shell," Washington, D. C., Feb. 1968, Reprinted Oct. 2002.
Image of a prior art nut sorter (undated but admitted to be prior art).
Image of a scaper on a prior art nut sorter (undated but admitted to be prior art).
Images of a prior art stick remover (undated but admitted to be prior art).

* cited by examiner

MODULAR NUT CLEANING PLANT

BACKGROUND

Pecans and other types of nuts when harvested require additional cleaning and processing to remove debris and unsuitable nuts from harvested nut product prior to the nuts being sold. A number of different pieces of equipment are used in the processing. The equipment used generally includes a number of separate pieces that each serve a different function. Each piece often takes up a significant amount of space, so that large open spaces are required to perform the different functions.

SUMMARY

A modular nut cleaning plant has a nut sizer with an intake end and a discharge end. The nut cleaning plant has a stick remover mounted to the nut sizer. The stick remover is configured to remove sticks and other debris in a nut product stream. In one embodiment a vacuum unit is mounted to the stick remover and is configured to pull, or suction loose debris from the nut product stream that is moving on the stick remover. The modular nut cleaning plant is reconfigurable in that an intake end of the stick remover may be positioned on either a left or a right side of the nut sizer.

In one embodiment the modular nut cleaning plant includes a plurality of support beams configured to mount the stick remover to the nut sizer. The nut sizer comprises a nut sizer frame and a rotatable nut sizer reel, which may be referred to as a nut sizer cage, mounted in the nut sizer frame. The nut sizer frame may include first and second spaced apart horizontal beams having open ends. In one embodiment the support beams that mount the stick remover to the nut sizer extend from the stick remover into the open ends of the spaced apart horizontal beams.

In an additional embodiment a debris conveyor is positioned beneath the nut sizer and is configured to collect debris passing out of the nut sizer as a nut product moves from the intake end thereof toward the discharge end. The debris conveyor is mounted to the nut sizer frame beneath the rotating nut sizer cage. In one embodiment the nut sizer frame comprises a pair of spaced apart beams for receiving the pair of support beams that will support the stick remover.

In one embodiment the nut sizer cage comprises an intake or rear sizer section and a forward, or discharge sizer section detachably connected thereto. The intake sizer section has a plurality of sizer rods to define first spaces therebetween. The discharge sizer section has a plurality of sizer rods with second spaces therebetween. In one embodiment the second spaces are larger than the first spaces. As a result, small nuts and small debris will pass through the first spaces and will be collected on the debris conveyor 40. Nuts that pass through the intake sizer section into the discharge sizer section will continue to be tumbled and rotated by the rotatable sizer cage. Nuts of the desired size will then pass through the spaces in the sizer rods in the discharge sizer sections. Those nuts will be delivered to further processing equipment such as an elevator or an aspirator by chute or other conveyance.

In one embodiment the stick remover has an intake end for receiving the nut product stream. The support surface at the intake end will support the nut product stream and an endless chain will deliver sticks and other debris carried by the endless chain through a discharge end of the stick remover. Such debris will be delivered into the debris conveyor. The endless chain on the stick remover defines openings therein. Nuts and debris that fall through the openings in the endless chain will pass into a delivery conveyor which will deliver the nuts and other debris that pass through the openings into the nut sizer for further processing and cleaning.

A reel sprocket is fixed to an intake end to the nut sizer cage. A drive motor is configured to rotate the reel sprocket which will rotate the rotatable nut sizer cage in the nut sizer frame. The reel sprocket may be connected to a circular support ring that is supported by bearings mounted to a bearing support plate. The bearing support plate may be fixed to the nut sizer frame. A second or additional circular support ring may be used to connect first and second separable sizer sections of the nut sizer cage. The second rotatable circular support ring will be supported by a bearing mounting plate that is structurally connected to the nut sizer frame.

In one embodiment a drive sprocket is driven by the drive motor for the reel sprocket. A tensioning sprocket may be mounted to the nut sizer frame. The drive chain engages the drive, reel and tensioning sprockets. The drive sprocket will in turn rotate the reel sprocket and the rotatable sizer cage. The tensioning sprocket is mounted and configured such that it may be moved to adjust tension in the chain. In addition, the tensioning sprocket may be loosened sufficiently or adjust sufficiently such that the chain can be loosened and/or removed. In one embodiment the rotatable sizer cage is not fixed to the nut sizer frame and is supported only by the bearings and connected by the drive chain. As a result, the nut sizer cage may be lifted upwardly from the nut sizer frame simply by loosening and/or removing the drive chain. Scrapers may be mounted to the frame to dislodge nuts and or debris that become lodged in spaces between the sizer rods. In some embodiments the spacers will have to be removed to remove the sizer cage. The spacers do not hold the nut sizer cage in place. In other words, the only external structural vertical restraint on the nut sizer cage is the chain. As is understood, the weight of the nut sizer cage keeps the nut sizer cage from moving vertically, but the only restraint that must be removed to lift the nut sizer cage is the chain.

In one embodiment the nut sizer cage includes the first and second sizer sections which may be referred to as intake and discharge sections respectively. The second section is connected to the first section with bolts or other fasteners that extend through the second circular support ring. The bolts may extend through annular support rings on both of the intake and discharge sections. Thus, the bolts or other fasteners may extend through a rear annular support ring on the discharge section and a forward annular support ring on the intake section. The rotatable sizer cage has a plurality of longitudinally extending sizer rods. The sizer rods are connected to the annular support rings.

In one embodiment the nut sizer frame includes a plurality of support legs. A plurality of substantially horizontal beams is connected to the support legs. In one embodiment the frame has openings at the intake end thereof to receive support beams for supporting additional processing equipment. The openings may be defined in the end of an upper pair of the substantially horizontal beams. A securing fastener may extend through the horizontal beams and engage the support beams to secure the support beams in place.

The vacuum unit may comprise a pair of spaced apart side panels which may be first and second side panels. The first and second side panels have outwardly extending flanges that are configured to connect to an additional apparatus, such as for example the stick remover. In one embodiment a vacuum duct is mounted to the first and second panels. The vacuum duct has a stationary upper portion and lower portion that is pivotably connected to the stationary portions. The vacuum unit will suction or vacuum debris from a nut product stream that passes thereunder. A flexible flap may be attached to the lower pivotable portion and more specifically may be attached to a forward panel on the lower pivot portions. The flexible flap will engage the stick remover when connected thereto and will aid in maintaining the necessary vacuum.

DESCRIPTION OF AN EMBODIMENT

Figure 1:
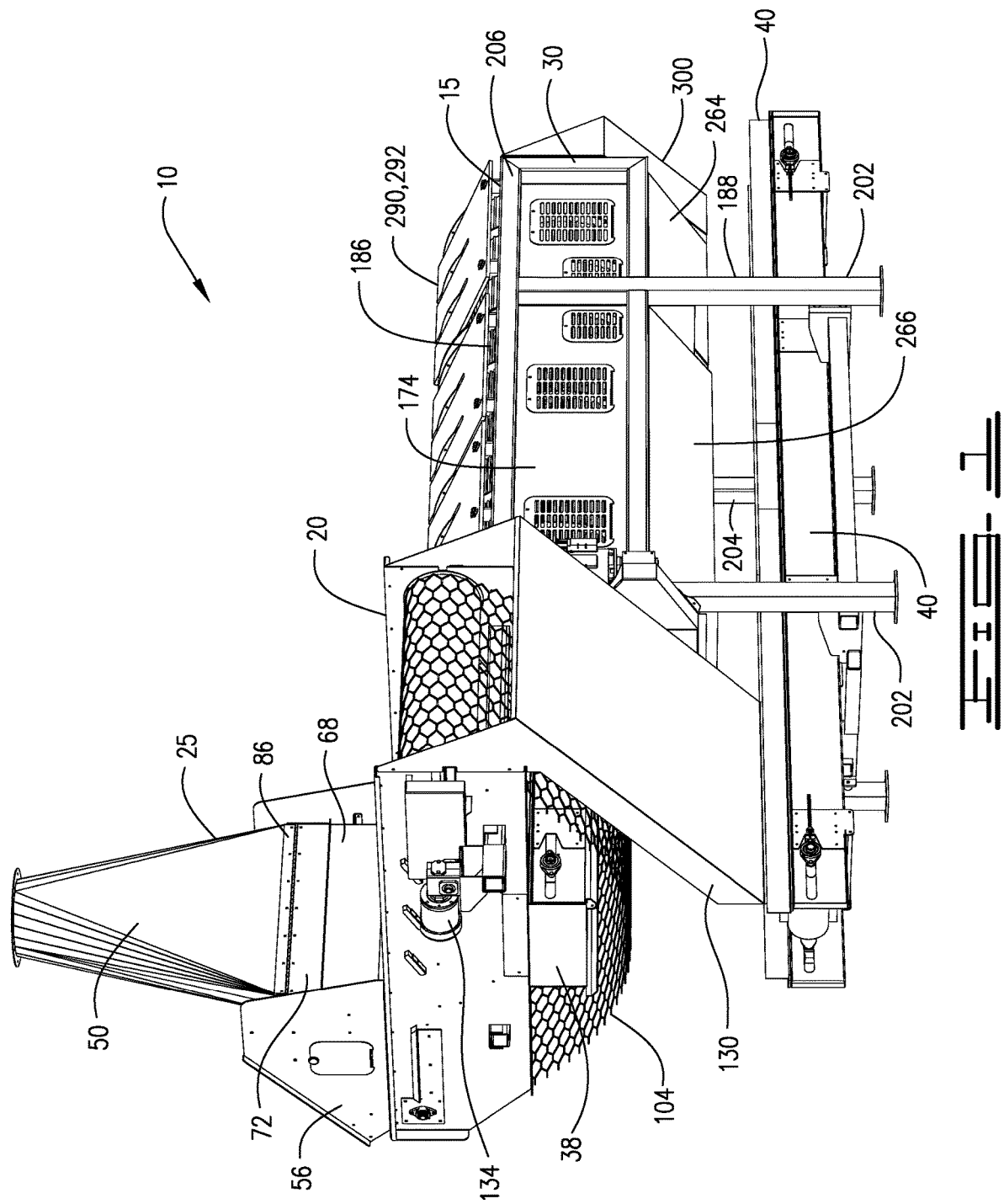
FIG. 1 is a perspective view showing the left and rear sides of a modular nut cleaning system.
Figure 2:
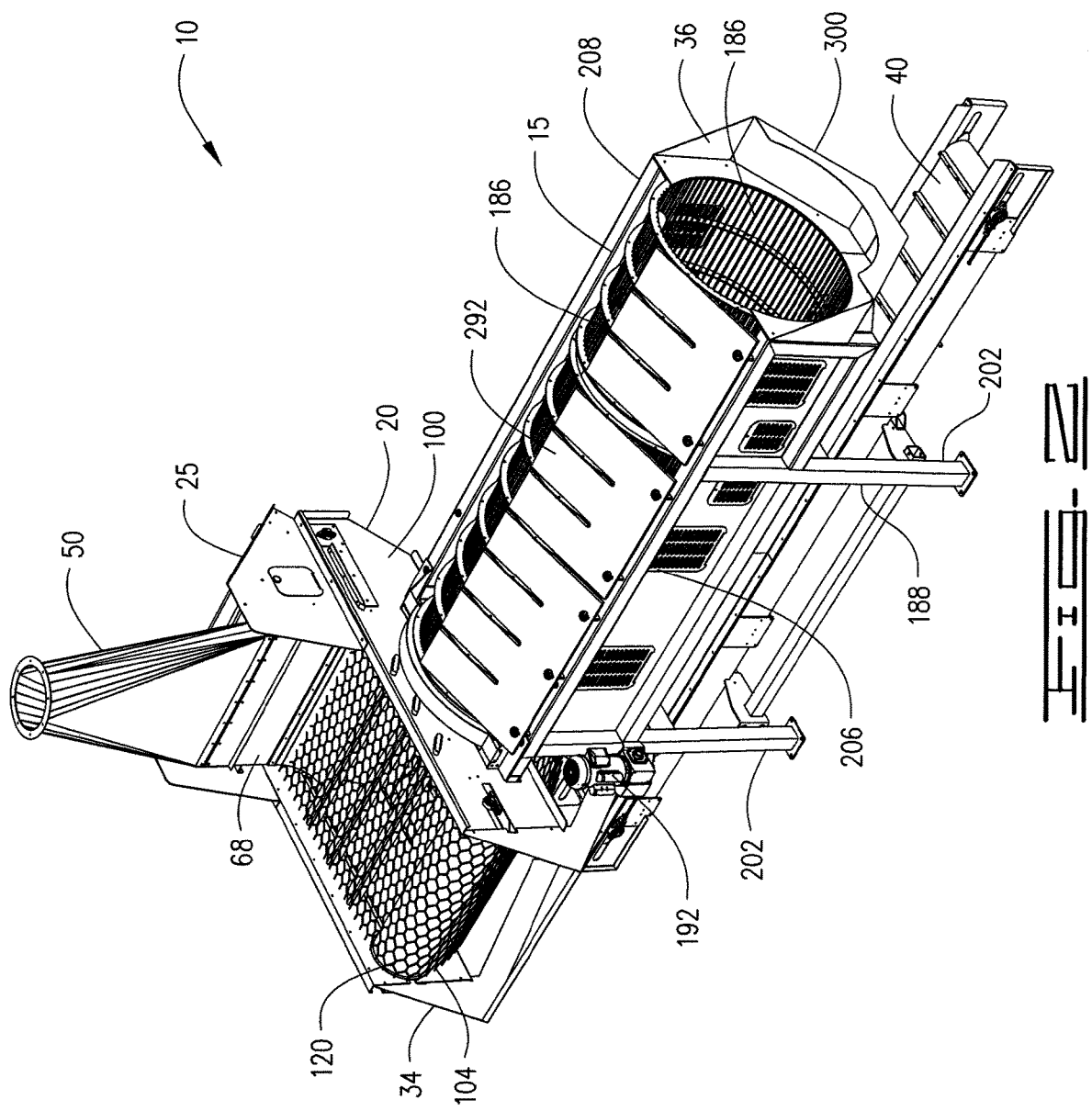
FIG. 2 a perspective view showing the left and forward sides of the modular nut cleaning system.
Figure 3:
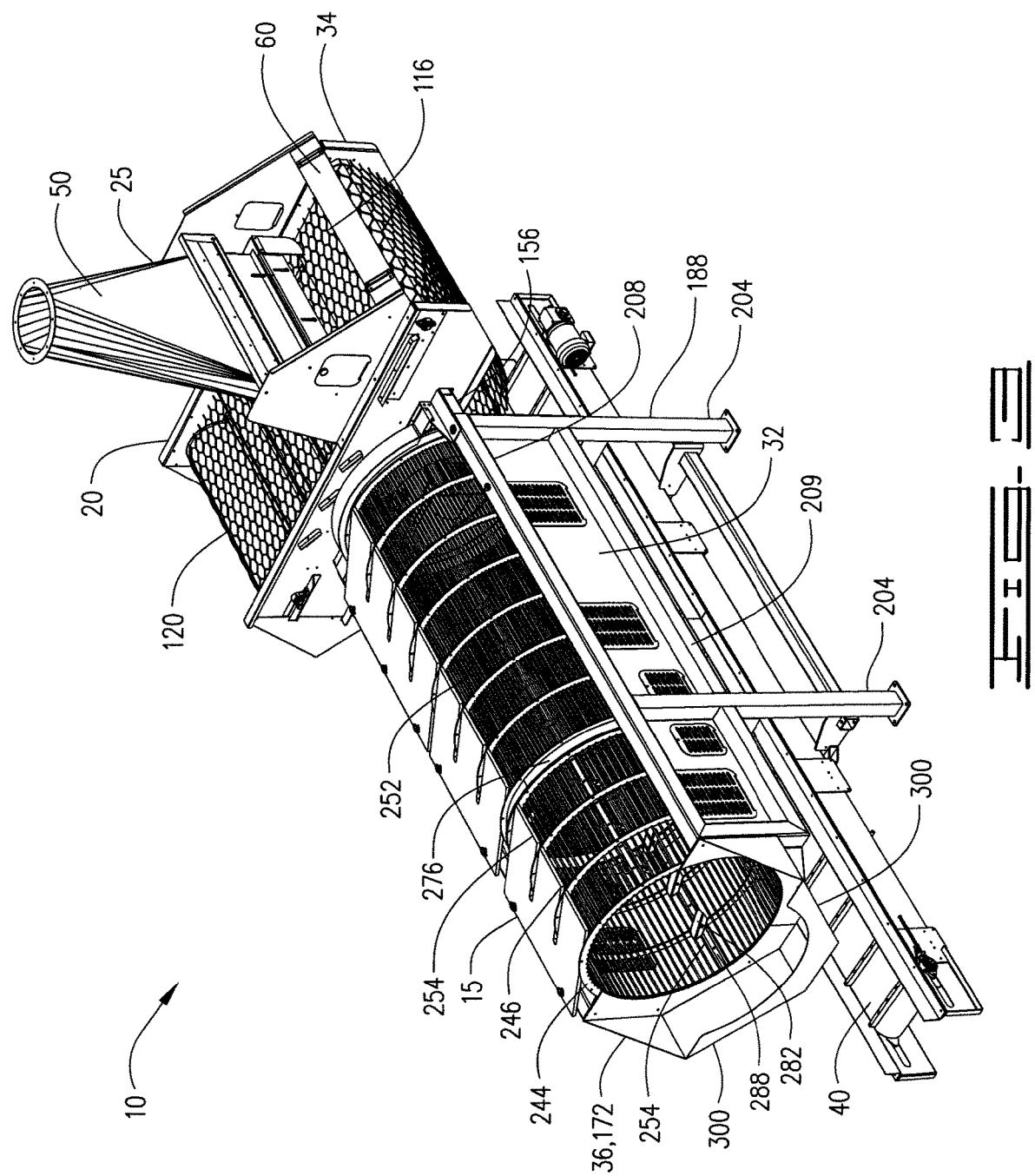
FIG. 3 is an additional perspective showing the right side of the modular nut cleaning system.
Figure 4:
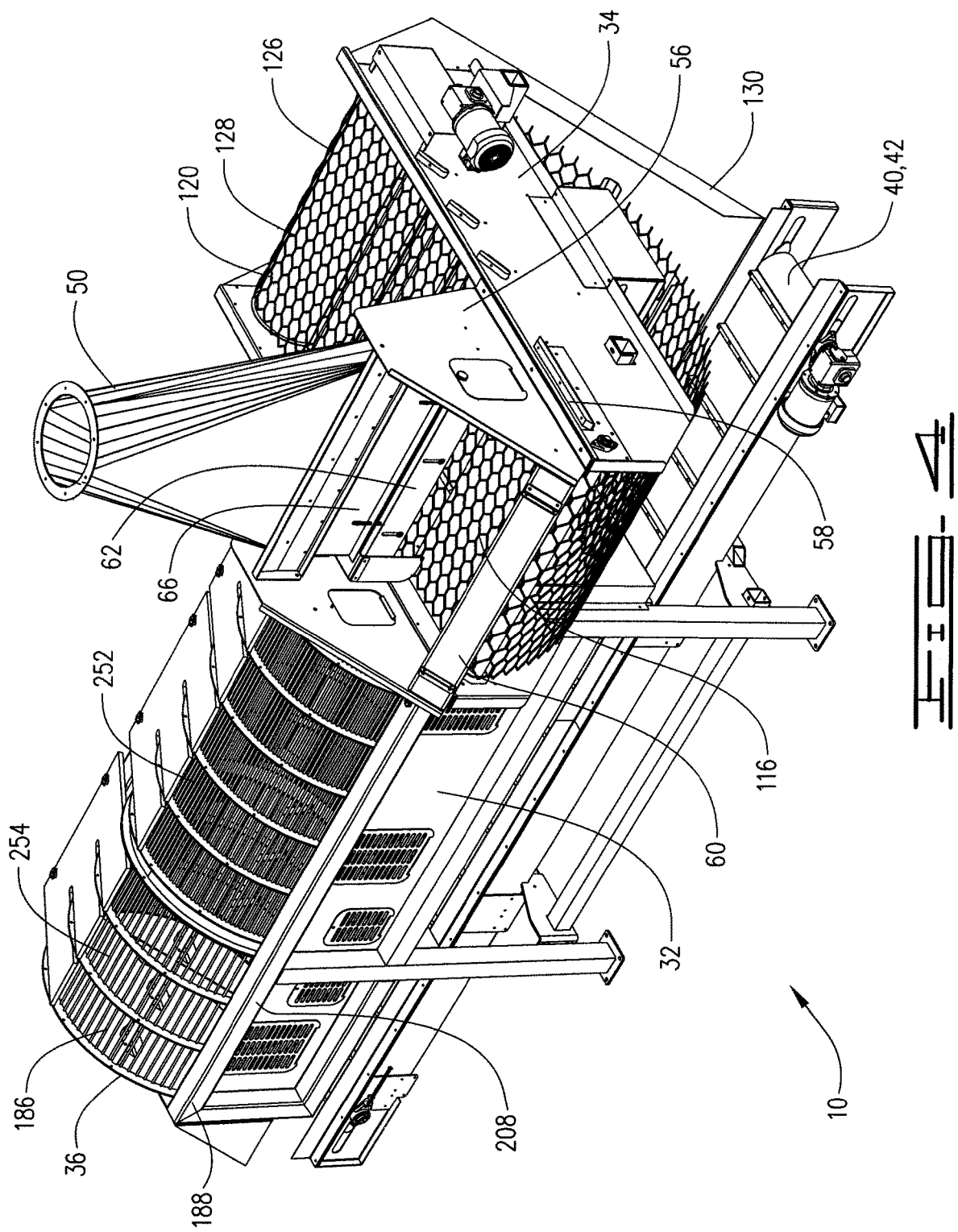
FIG. 4 is an additional view of the modular nut cleaning system.
Figure 5:
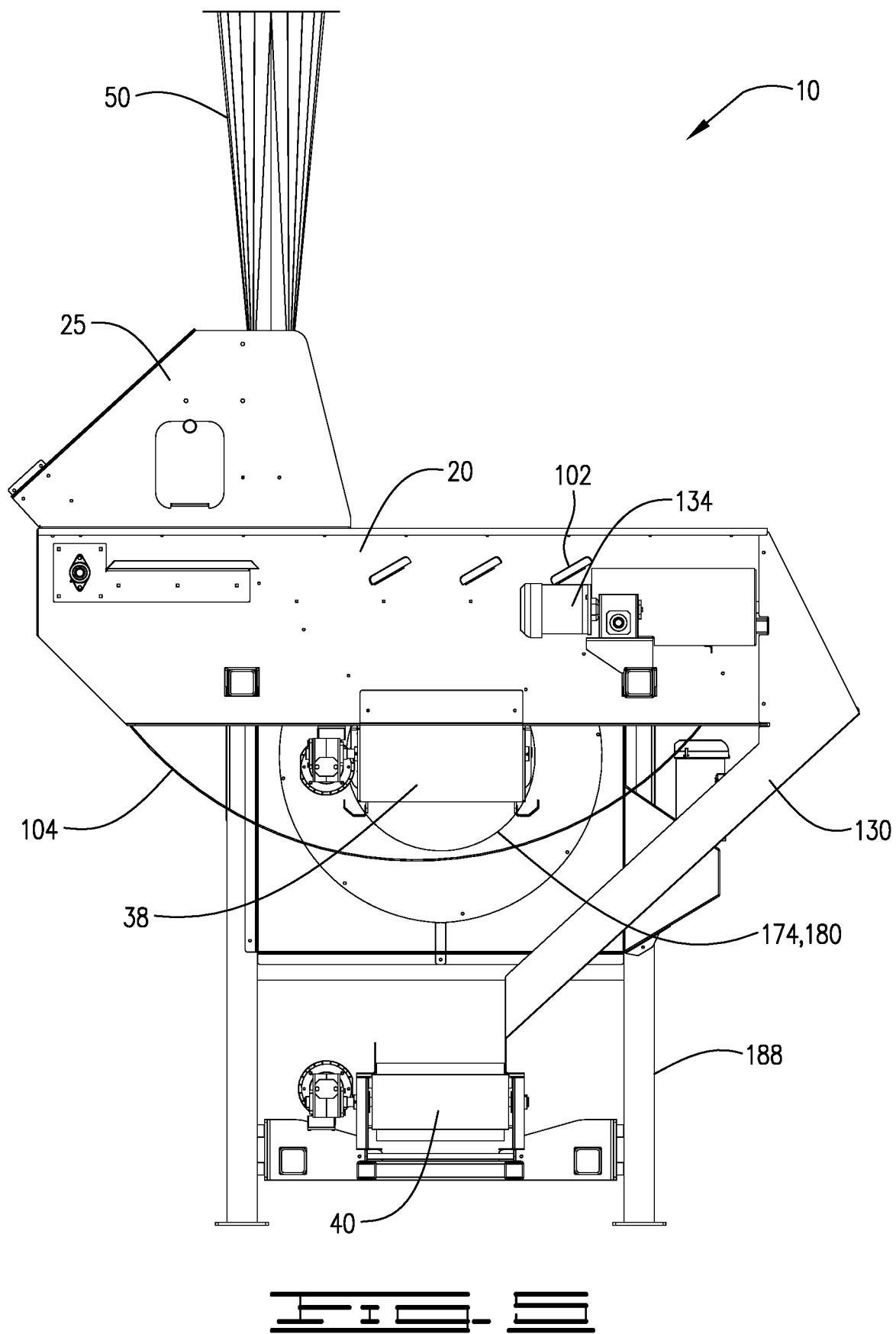
FIG. 5 is a view from the rear end of the modular nut cleaning system.
Figure 6:
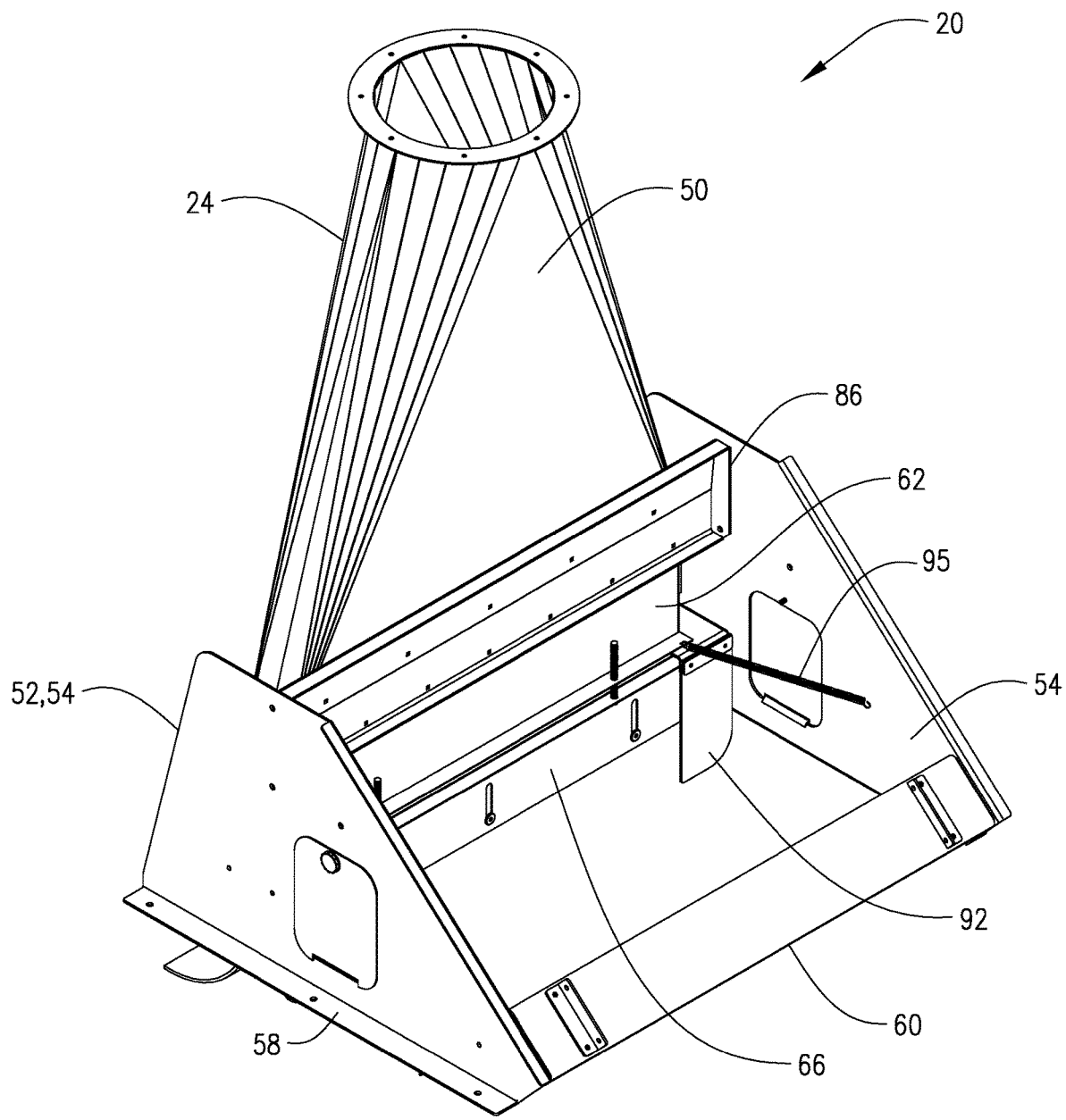
FIG. 6 is a perspective view of the vacuum unit of the modular nut cleaning system.
Figure 7:
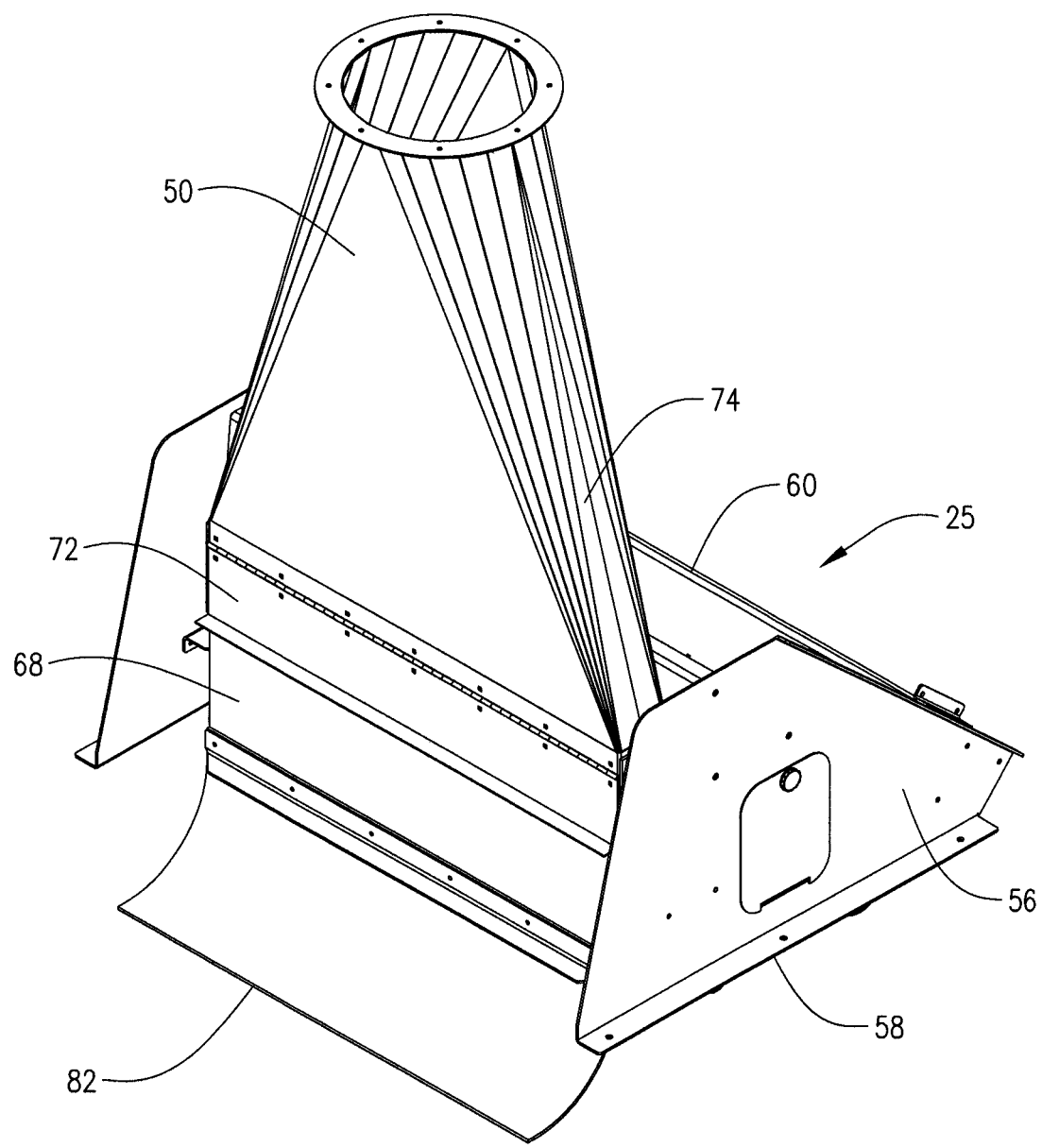
FIG. 7 is an additional perspective view of the vacuum unit showing the forward side thereof.
Figure 8:
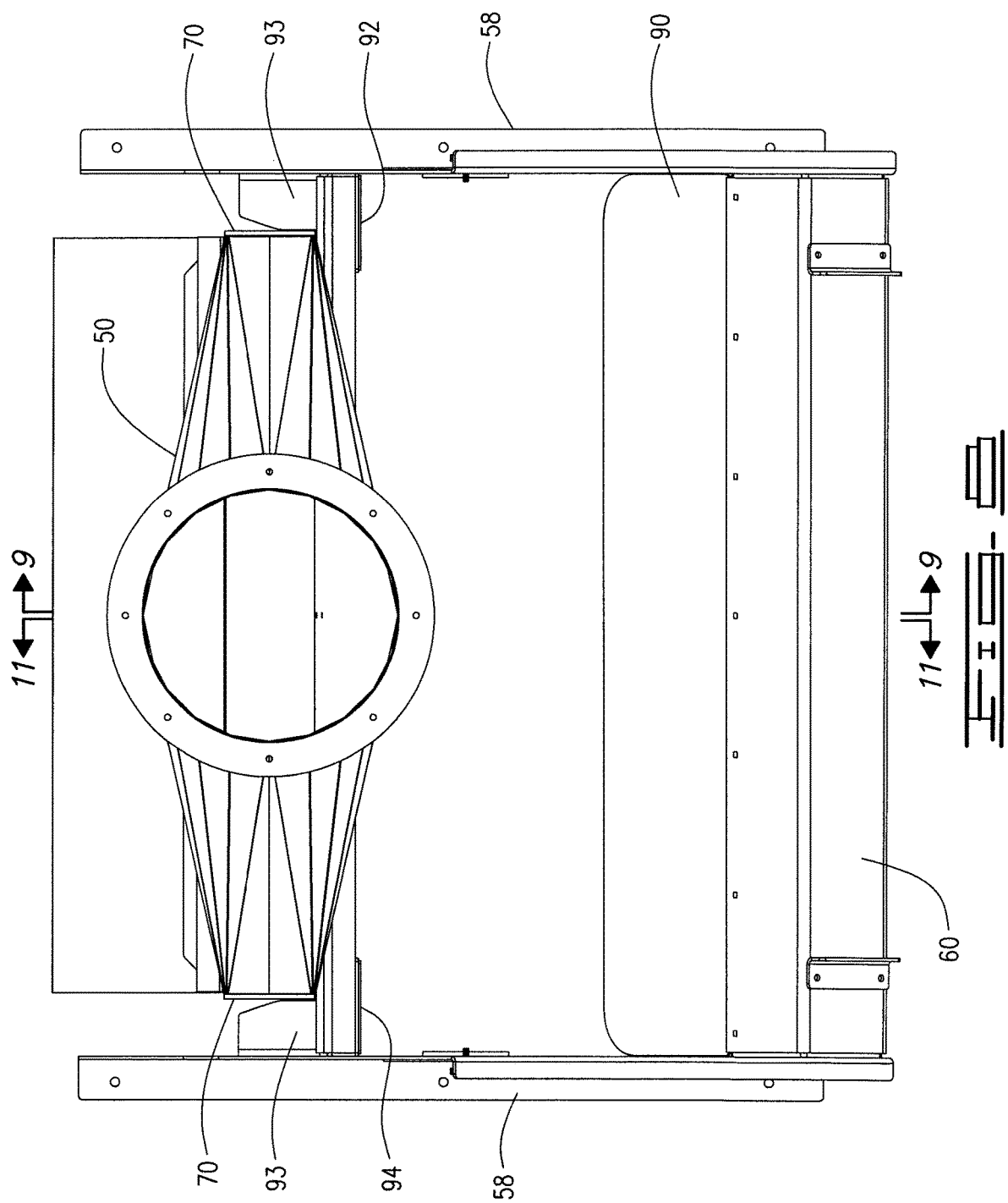
FIG. 8 is a top view of the vacuum unit.
Figure 9:
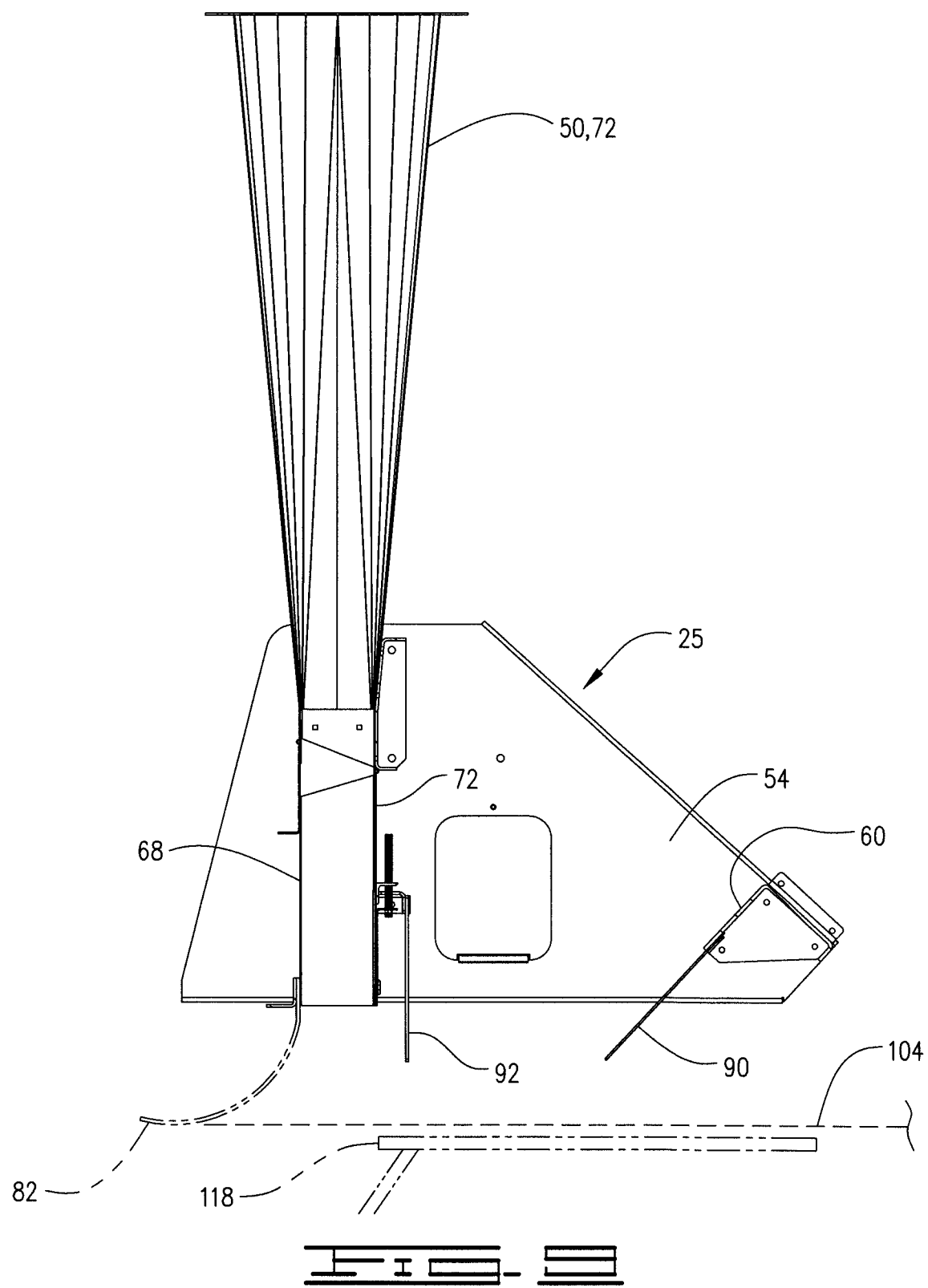
FIG. 9 is a section view from lines 9-9 of FIG. 8.
Figure 10:
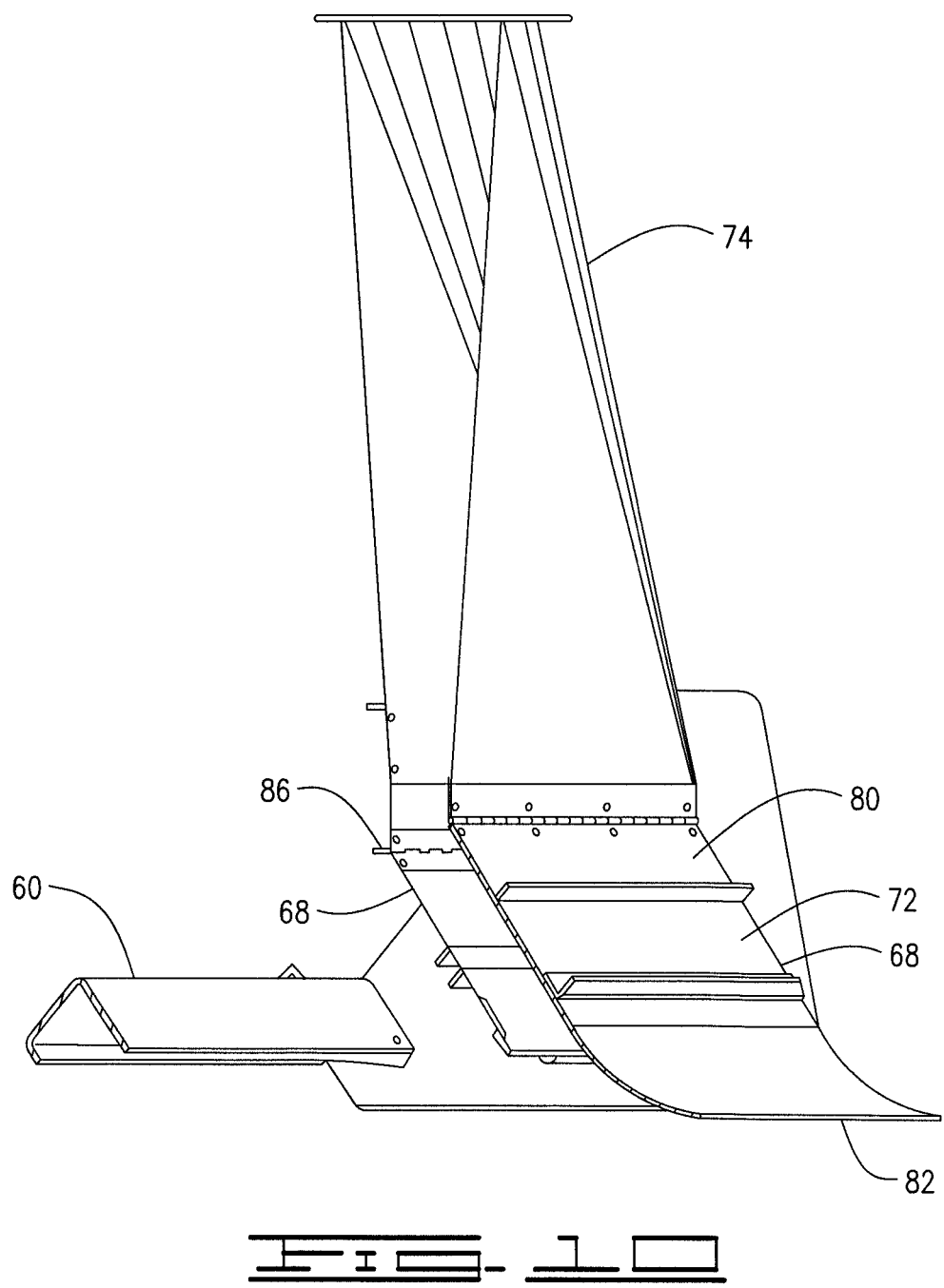
FIG. 10 is an angled section view of the vacuum unit.
Figure 11:
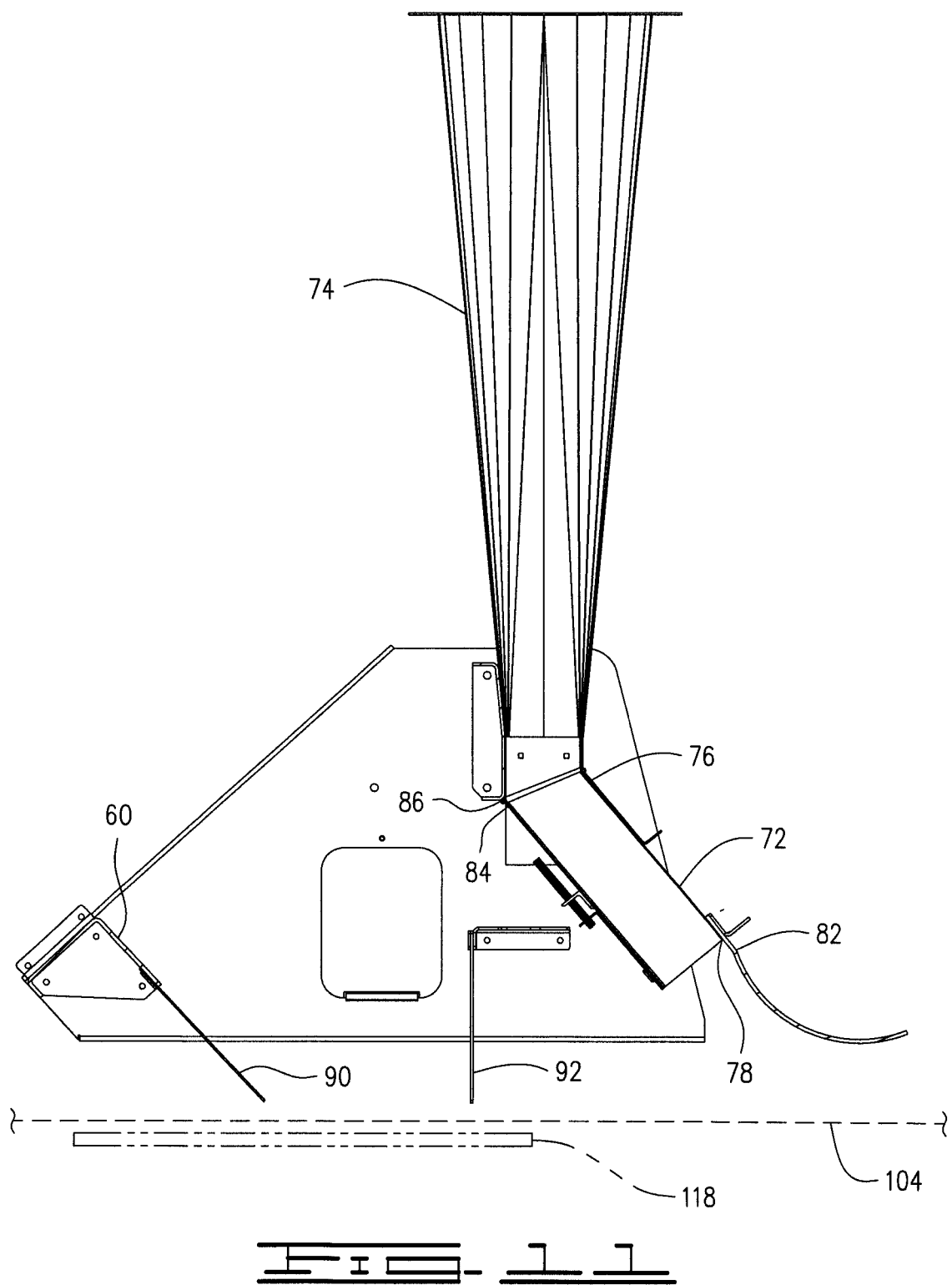
FIG. 11 is a cross section view in the direction of 11-11 from FIG. 8 showing the lower portion of the vacuum unit pivoted.

The current disclosure is directed to a customizable reconfigurable modular nut cleaning system 10. The modular nut cleaning system may be referred to as a modular nut cleaning plant 10. The modular nut cleaning plant 10 may be utilized to perform cleaning and sizing processes for different types of nuts, and specifically for pecans. Modular nut cleaning plant 10 comprises different pieces of nut processing apparatus, including in the embodiment shown a nut sizer 15, a stick remover 20 mounted to the nut sizer 15 and a vacuum unit 25, which may be referred to as a pre-vac mounted directly to the stick remover 20. Modular cleaning system 10 has left side 30 and right side 32 and rear and forward ends 34 and 36 respectively. A delivery conveyor 38 is mounted to the stick remover 20. Nut delivery conveyor 38 may include a cleated conveyor belt 39.

A debris conveyor 40 is positioned beneath the nut sizer 15 and is configured to receive debris and/or undesirable nuts from stick remover 20 and nut sizer 15 as will be explained in more detail hereinbelow. Stick remover 20 is removably and reversibly connected to the nut sizer 15 and configured such that it can be rotated and connected to the nut sizer 15 to provide a reversible intake or entry location. In other words, nuts, as part of a harvested nut product stream, are provided at an intake end of the stick remover 20, and the position of the intake end can be on either left side 30 or right side 32 of the nut sizer 15. Generally, nuts are provided to the stick remover 20 as part of a harvested nut product stream with an elevator or other known equipment. The nut product stream will include harvested nuts, grass, leaves, hulls and other light debris, and may also include heavier debris such as rocks, dirt clumps, sticks, and other heavy undesirable debris. The nut product stream will have debris and some nuts removed as it passes from the stick remover into the nut sizer, and more nuts and debris removed as it passes through the nut sizer.

Stick remover 20 will convey the nut product stream through the vacuum unit 25. Vacuum unit 25 will suction, or pull light debris from the nut product stream. The nut product stream will be carried by an endless chain on the stick remover 20, and is supported at the entry end of the stick remover 20 by a flat, low friction support surface.

The endless chain on the stick remover 20 has openings that will allow nuts, and a portion of the debris not suctioned by vacuum unit 25 to pass therethough into delivery conveyor 38. Other debris, including sticks and debris larger than the openings in the endless chain will be carried by the chain and passed into a chute or other conveyance and into debris conveyor 40.

The nut product and remaining debris passed into the delivery conveyor will be connected by the delivery conveyor 38 into nut sizer 15. Nut sizer 15 has a rotatable nut sizer cage with an intake end and a discharge end. Nuts will be conveyed from the intake end toward the discharge end. Nuts of an undesirable size, and additional debris will pass through spaces in a front section of the nut sizer cage into the debris conveyor 40. Debris conveyor 40 may include a cleated conveyor belt 42. Nuts that don't fall through spaces in the first section of the nut sizer cage will pass into a second section thereof. Nuts of a desired size will pass through spaces in the nut sizer cage to a chute or other conveyance that will deliver the desired nuts to other equipment for further processing and cleaning.

The details of vacuum unit 25 are better seen in FIGS. 5-11, in which vacuum unit 25 is shown disconnected from the modular nut cleaning plant 10. Vacuum unit 25 is configured to remove grass, leaves, hulls, and other light debris from the harvested nut product at or near the first stage of the nut cleaning process. The harvested nut product will be delivered as part of a nut product stream which includes the light debris, and other, heavier unwanted debris. Vacuum unit 25 is mounted to stick remover 20 near the receiving end, or intake end of the stick remover 20. Nuts are conveyed along a sizing chain on the stick remover 20. The nut product stream first will land on and slide over a flat, low friction surface before reaching a sloping surface where much of the good nut product will fall below the horizontal portion of the sizing chain and will slide down to delivery conveyor 38 which may be for example a horizontal cleated belt conveyor. The details of stick remover 20 will be described later, Vacuum unit 25 includes a vacuum duct 50. When vacuum unit 25 is mounted to stick remover 20, vacuum duct 50 is located generally above the area immediately after the desired nut product falls and is channeled to the delivery conveyor 38 therebelow. The vacuum duct 50, which may be a rectangular vacuum duct 50, is hinged so that it may pivot to allow a continued flow of product when large pieces of the debris are carried on the sizing chain of stick remover 20.

As depicted in the FIGS. vacuum unit 25 includes sidewalls 52 which may comprise left and right sidewalls, or side panels, 54 and 56, respectively. Flanges 58 that extend outwardly from sidewalls 52 may be utilized to mount vacuum unit 25 to stick remover 15. Vacuum unit 25 may be connected with bolts or other known means to stick remover 20. A lateral support 60 extends between and is connected to the sidewalls 54 and 56. The nut product stream will pass over lateral support 60 to be delivered to the vacuum duct 50. The nut product stream will be subjected to a vacuum as it passes under vacuum duct 50. Vacuum duct 50, which may be referred to as vent duct 50 comprises rear panel 62, forward panel 68 and side panels 70 to connect rear and forward panels 62 and 68 respectively.

Vacuum duct 50 is a hinged or pivotable vent duct with vertically adjustable lower door or louver 66. Hinged vacuum duct 50 comprises a lower hinged, or pivotable duct portion 72, and stationary upper duct portion 74. Forward panel 68 has an upper end 76 and a lower or bottom end 78. Upper end 76 is connected to a hinge 80. A rubber flap 82 is connected to lower end 78 of forward panel 68. The rubber flap 82 will help to maintain suction through vacuum duct 50, but will allow solid material, for example nuts and debris to pass therethrough. Hinge 80 is connected to fixed, or stationary upper portion 74 of vacuum duct 50.

Rear panel 62 has an upper end 84 which has hinge 86 attached thereto. Hinge 86 is connected to stationary upper portion 74 of vacuum duct 50. Hinge 86 may be connected to both of side walls 54 and 56 and may hold upper duct portion 74 in place, while allowing the pivoting motion of lower duct portion 72.

A sloped panel 90 is connected to the lateral support 60 and directs nut product on to the stick remover 20. Nut spreaders 92 and 94 are connected to side panels 54 and 56 and may aid in directing the nut product stream toward the center of vacuum duct 50, and will also aid in spreading the nut product out and breaking up large clumps of debris and/or nuts. Nut spreaders 92 and 94 may be generally L-shaped pieces. Nut spreaders 92 and 94 may be made of a flexible material, for example a flexible rubber. Nut spreaders 92 and 94 may be connected to side panels 52 with brackets 93. A spring 95, and in some embodiments a pair of springs 95 are attached to sidewalls 52 and to pivotable portion 72 to bias the portion 72 towards the non pivoted position. A fan, or other vacuum generating device may be mounted to a top of a vacuum duct 50 to create the desired vacuum. When positioned on stick remover 20 lower duct portion 72 of vacuum duct 50 will pivot if large pieces of debris, or clumped nuts are delivered onto stick remover 20. The pivoting motion will allow the debris to pass thereunder and be carried along by a sizing chain on stick remover 20 which is described below. The pivotable vacuum duct 50 will prevent sticks and other debris from clogging the vacuum unit 20 so that the nut product stream will continue moving along the sizing chain on the stick remover.

Figure 12:
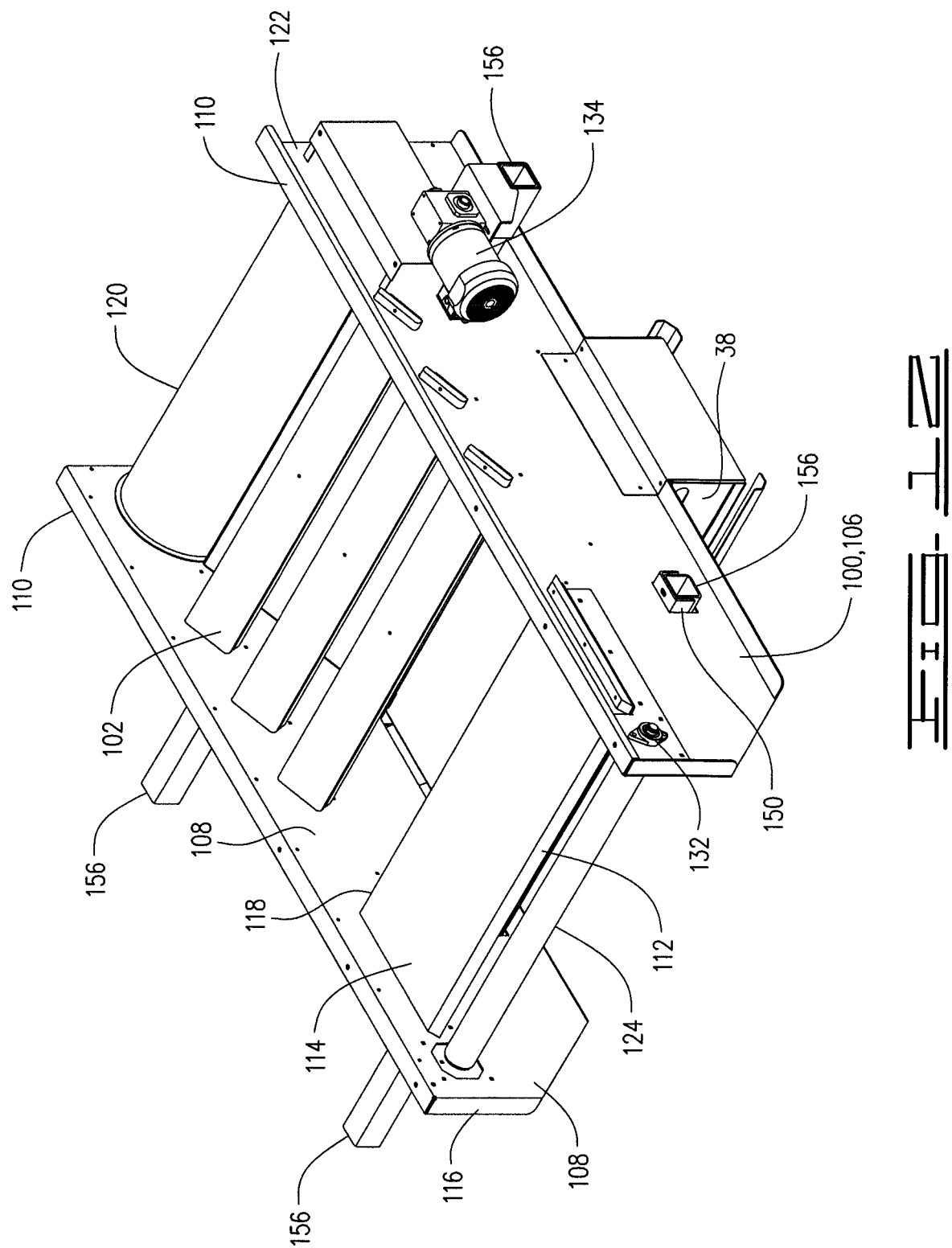
FIG. 12 is a view of the stick remover of the modular cleaning system of the endless chain removed.
Figure 13:
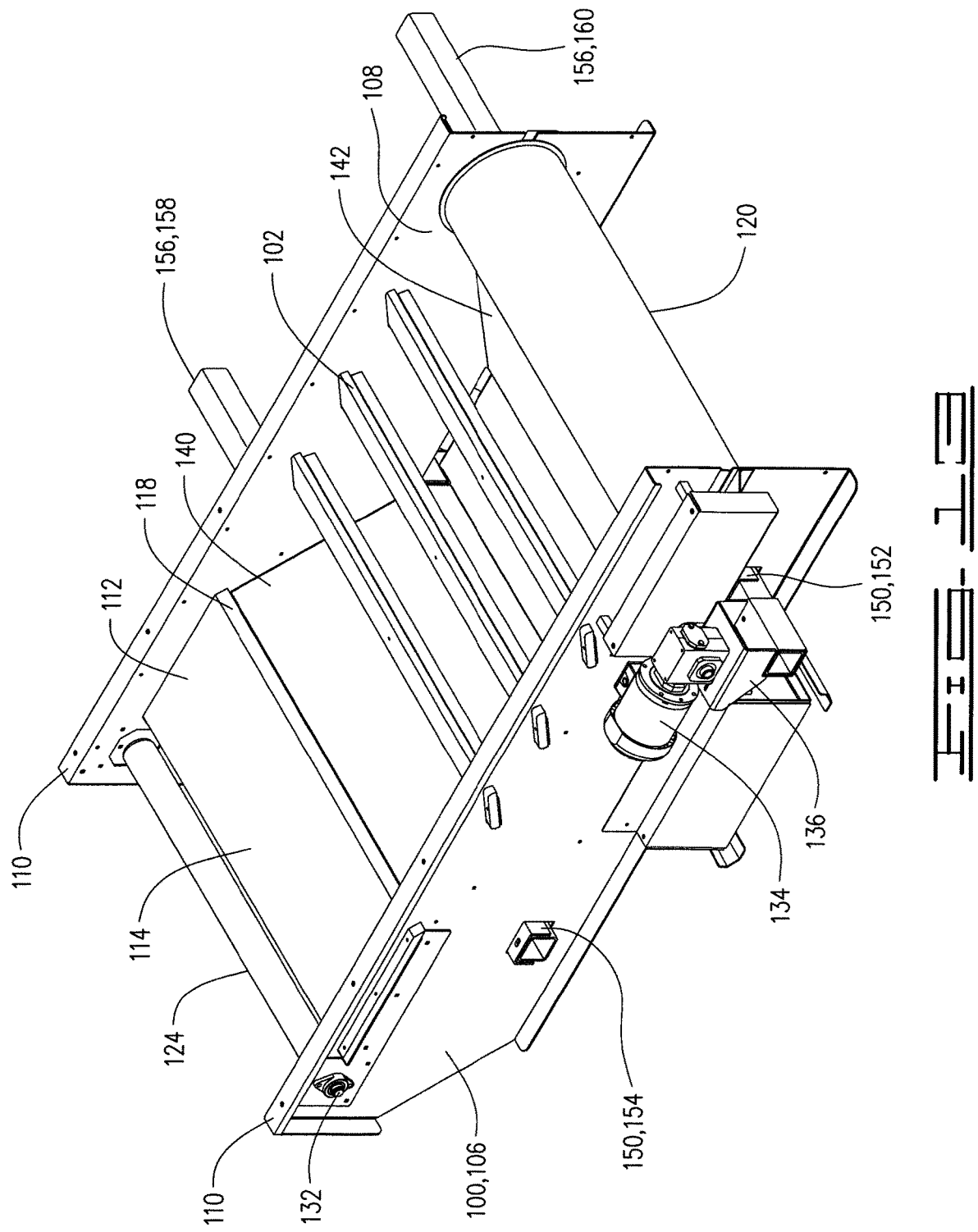
FIG. 13 is an additional perspective view of the stick remover with the chain removed.
Figure 14:
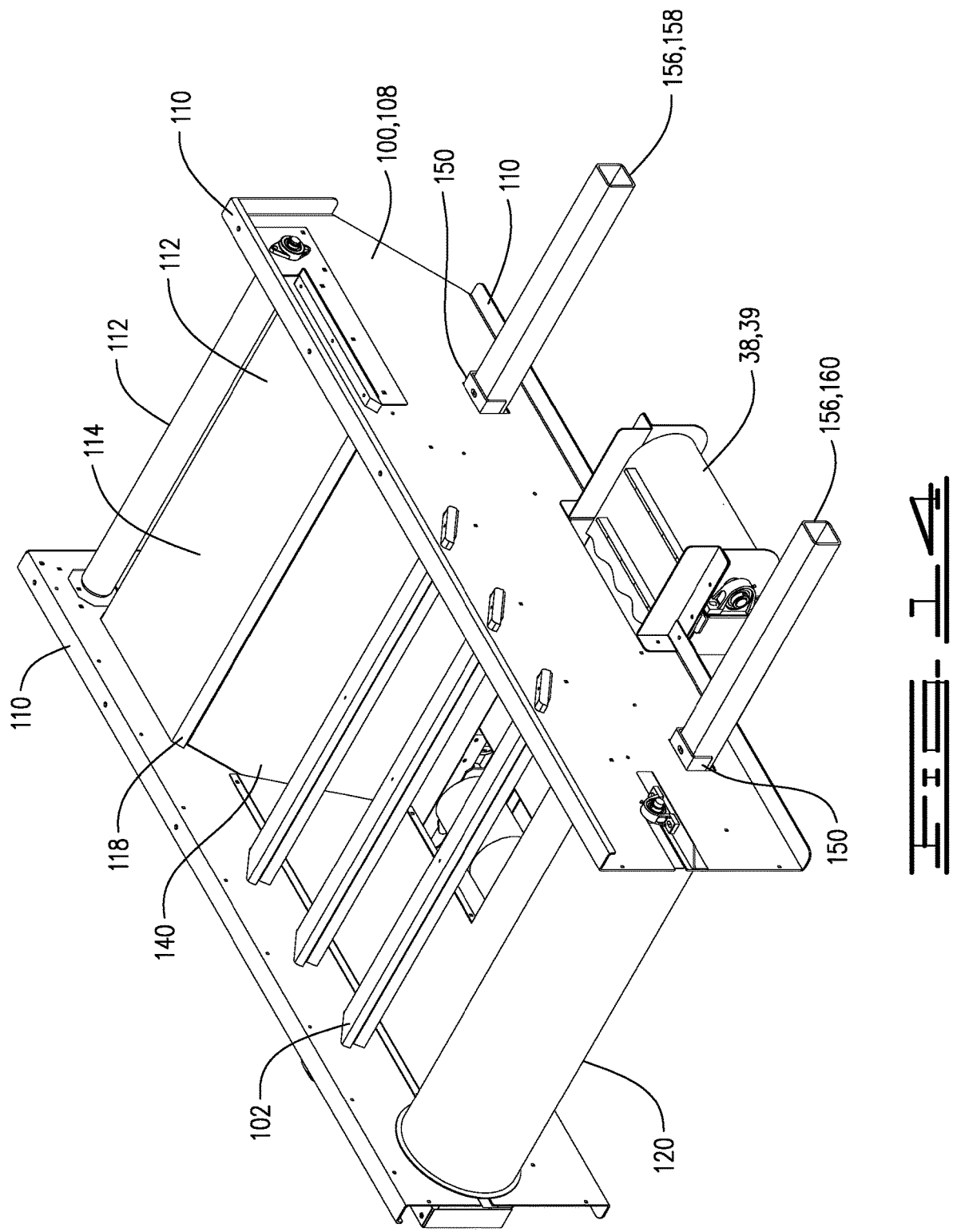
FIG. 14 is an additional view of the stick remover.
Figure 15:
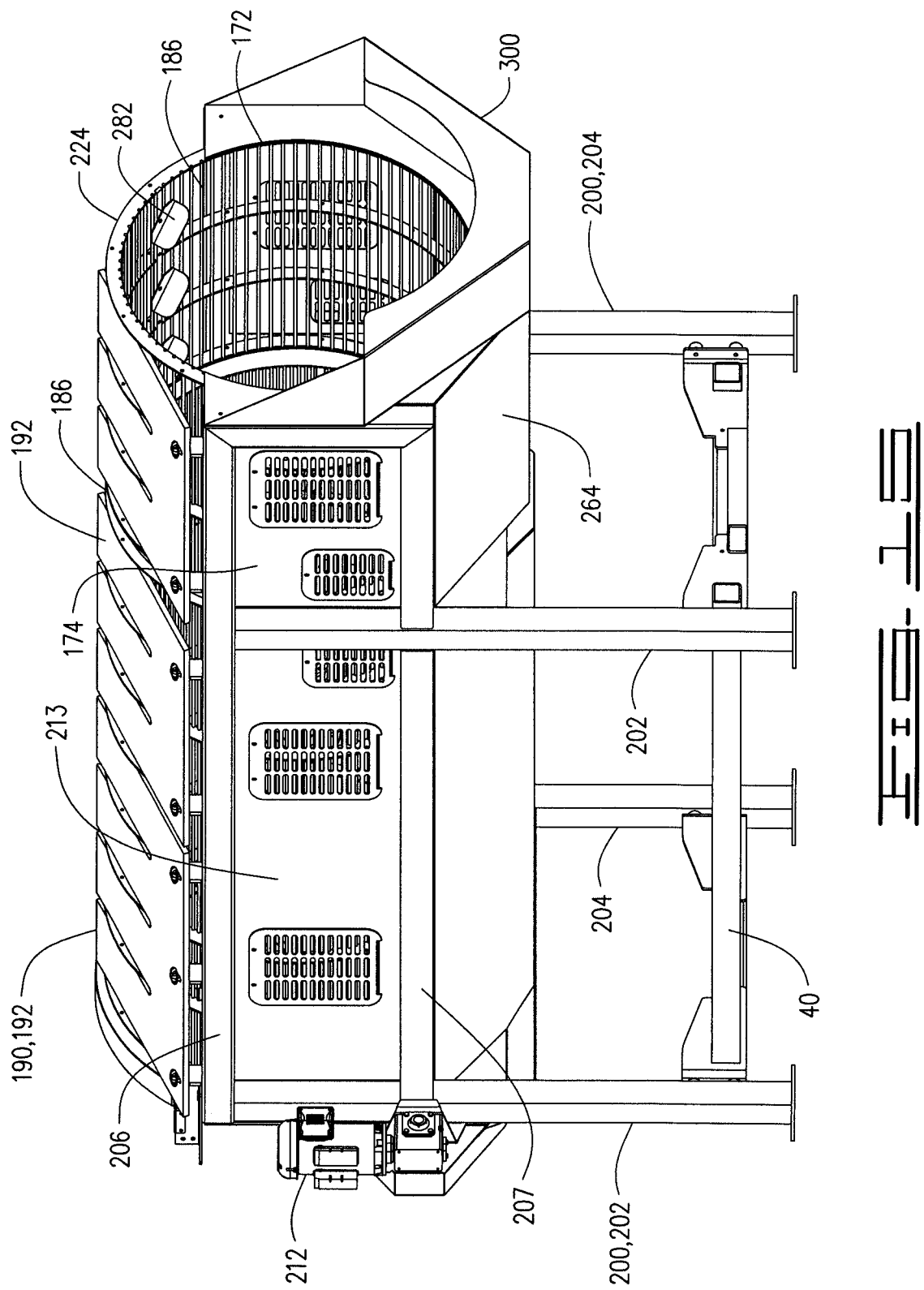
FIG. 15 is a perspective view of the nut sizer showing the left and forward sides.
Figure 16:
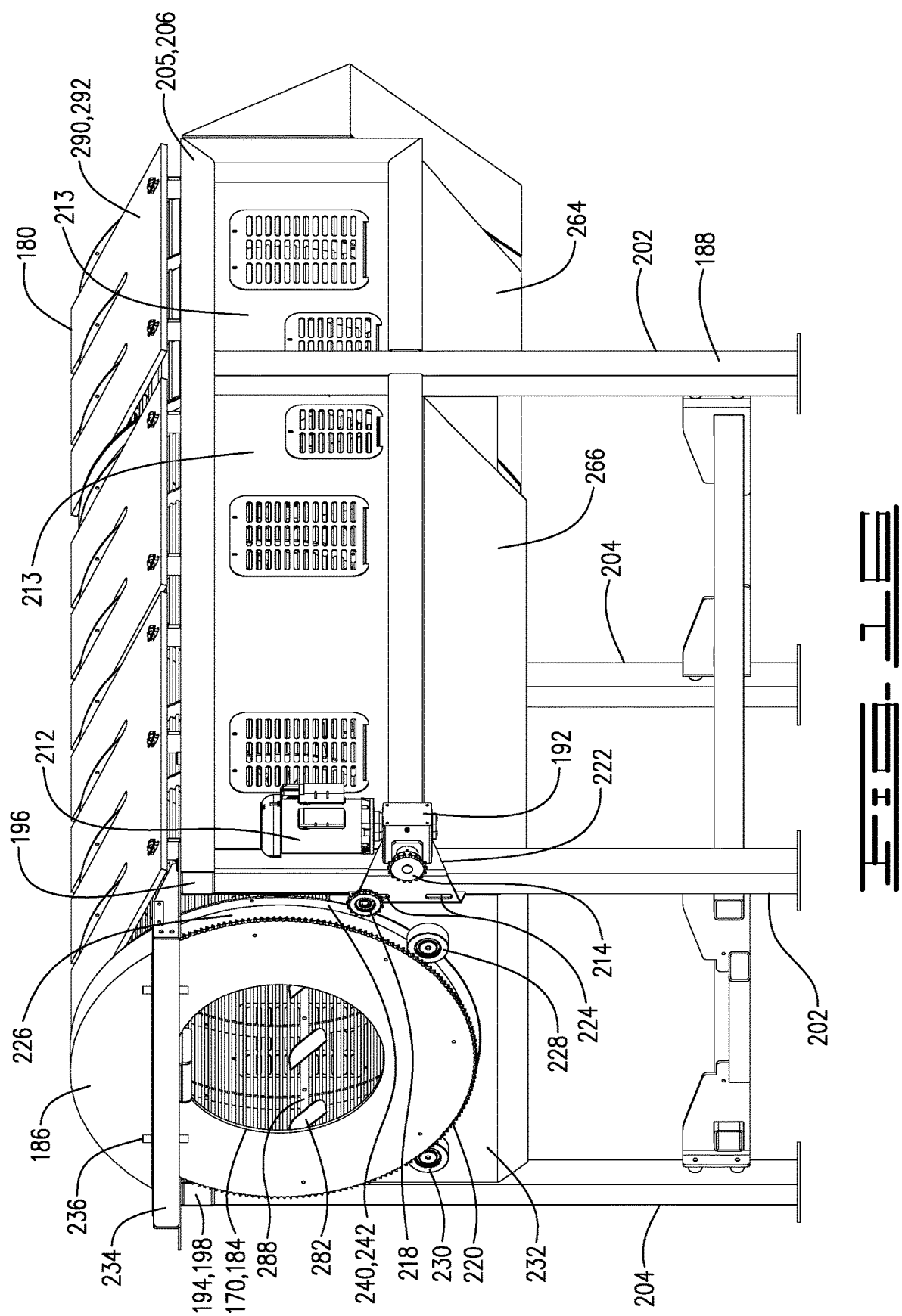
FIG. 16 is an additional perspective view of the nut sizer showing the rear and left sides.
Figure 17:
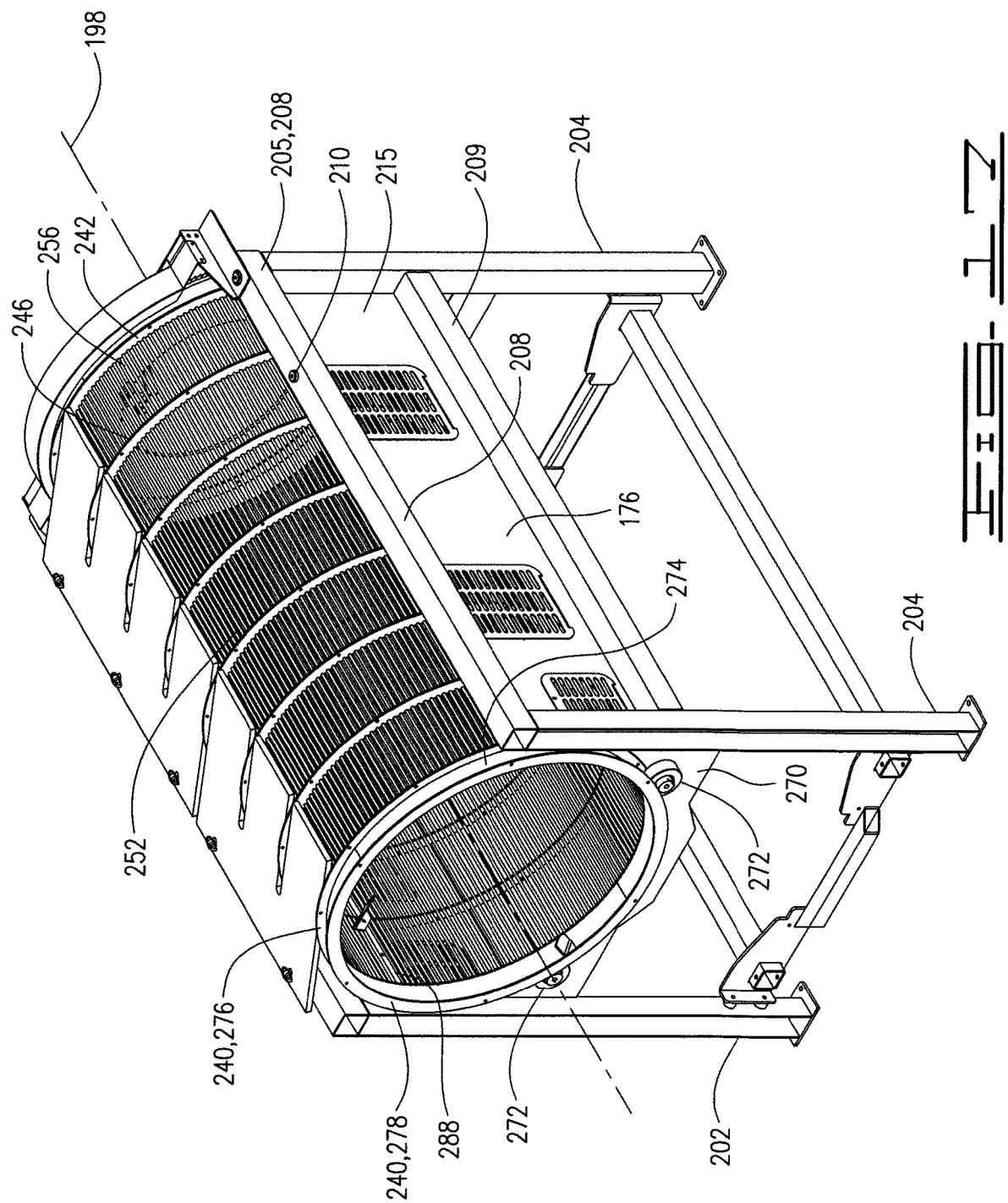
FIG. 17 is a perspective view of the nut sizer with the second section removed showing the inside of the nut sizer.
Figure 18:
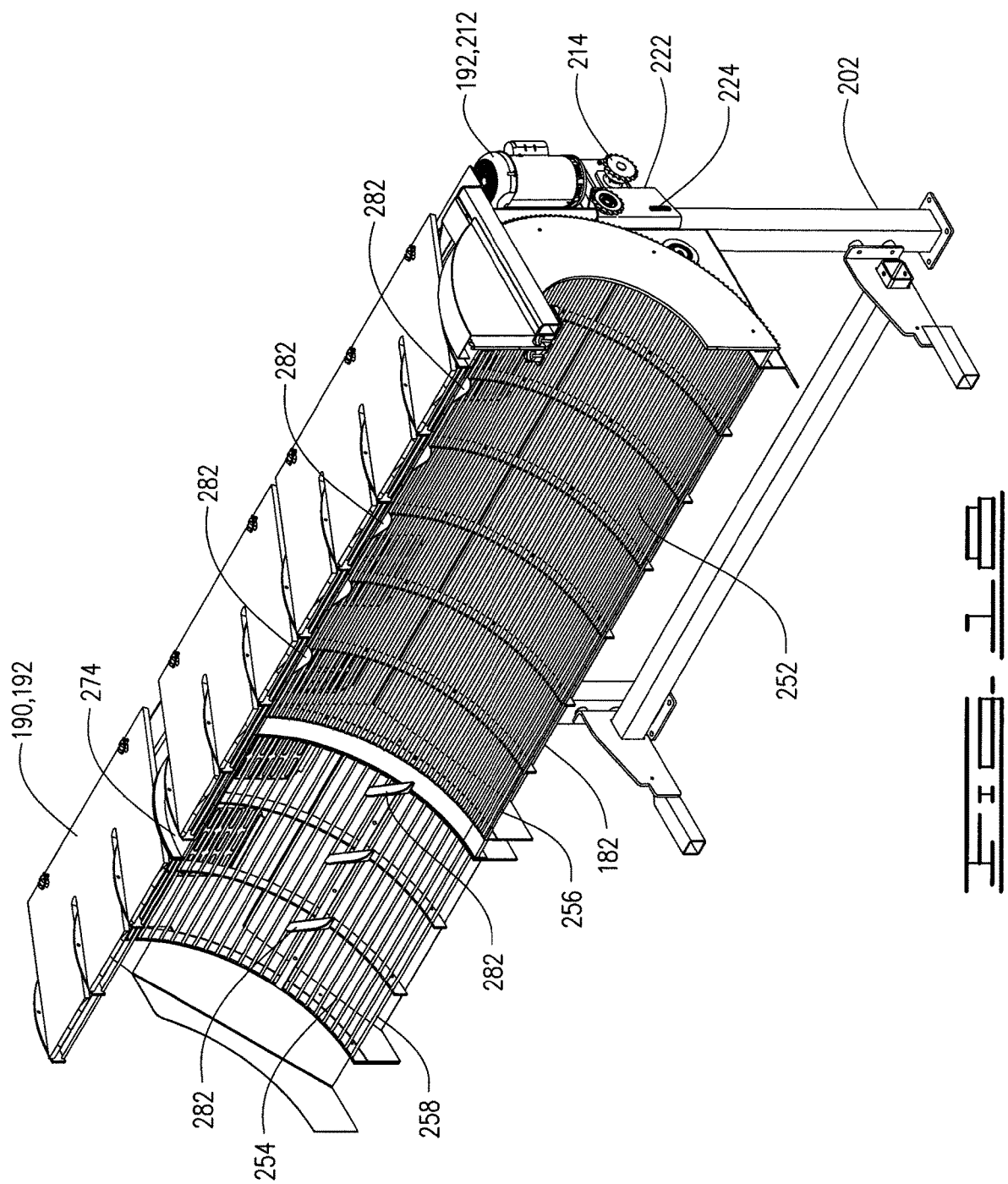
FIG. 18 is a cross section showing the inside of the nut sizer.
Figure 19:
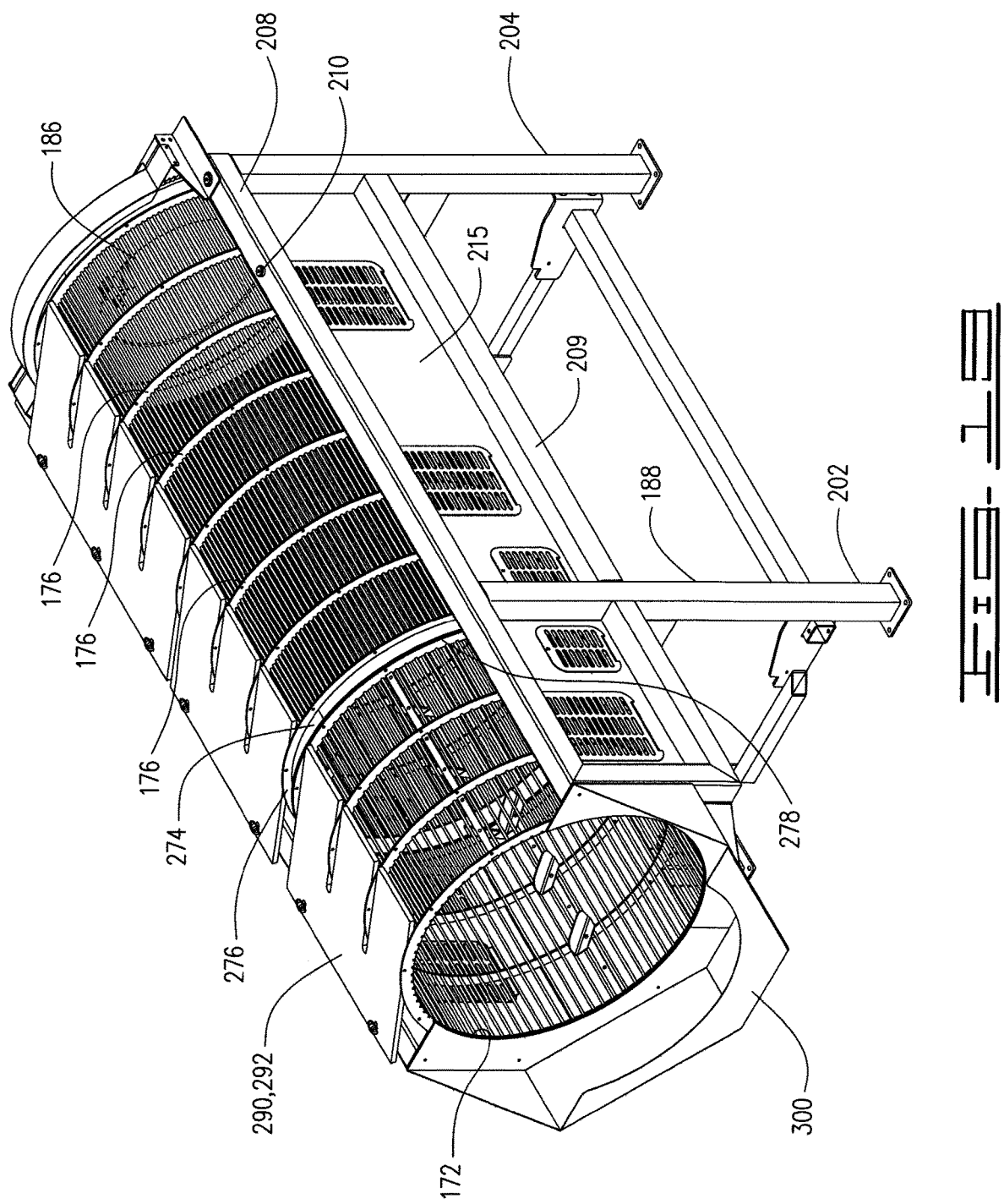
FIG. 19 is a view showing the right and forward sides of the nut sizer.
Figure 20:
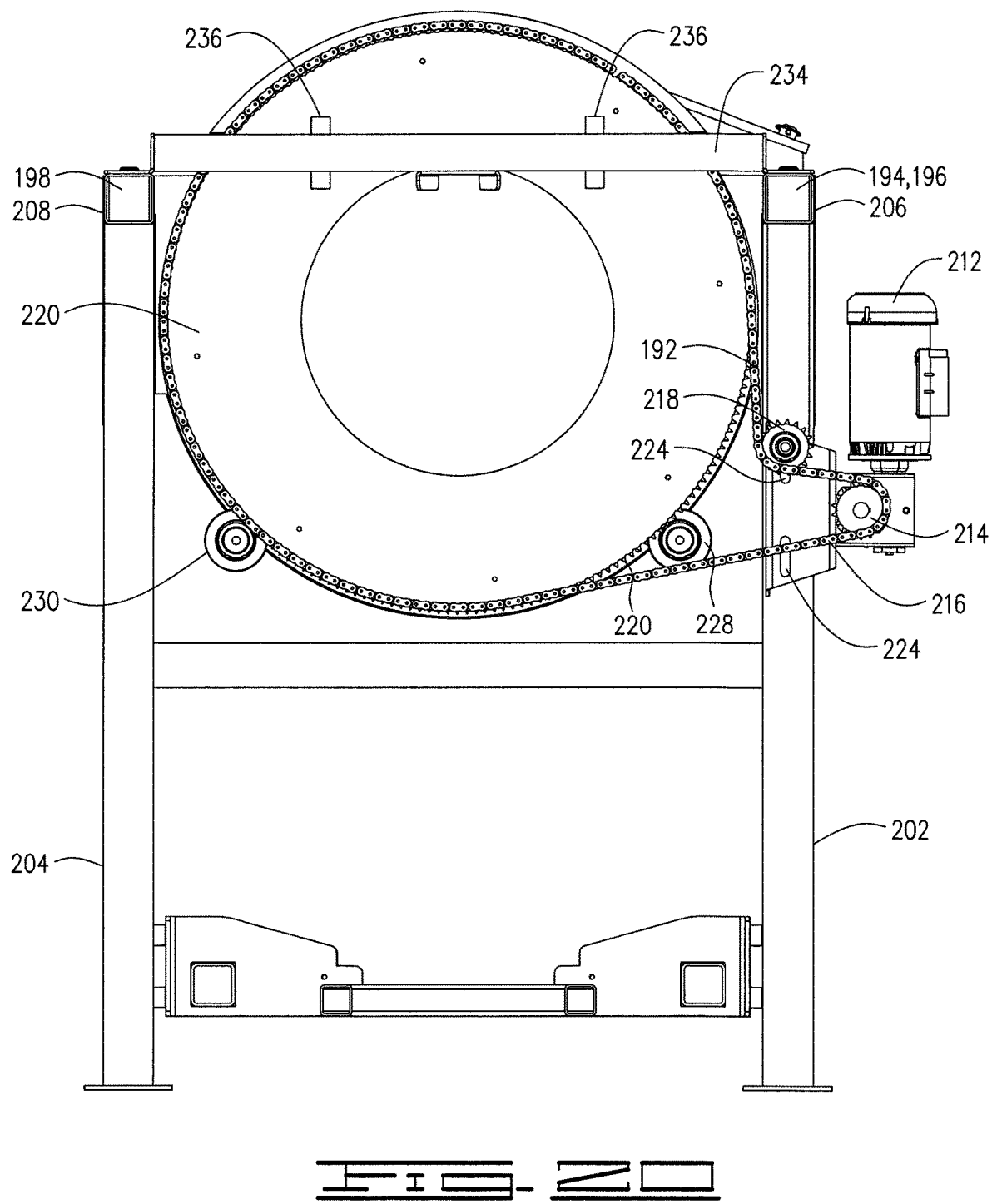
FIG. 20 is a view looking at the intake end of the nut sizer.
Figure 21:
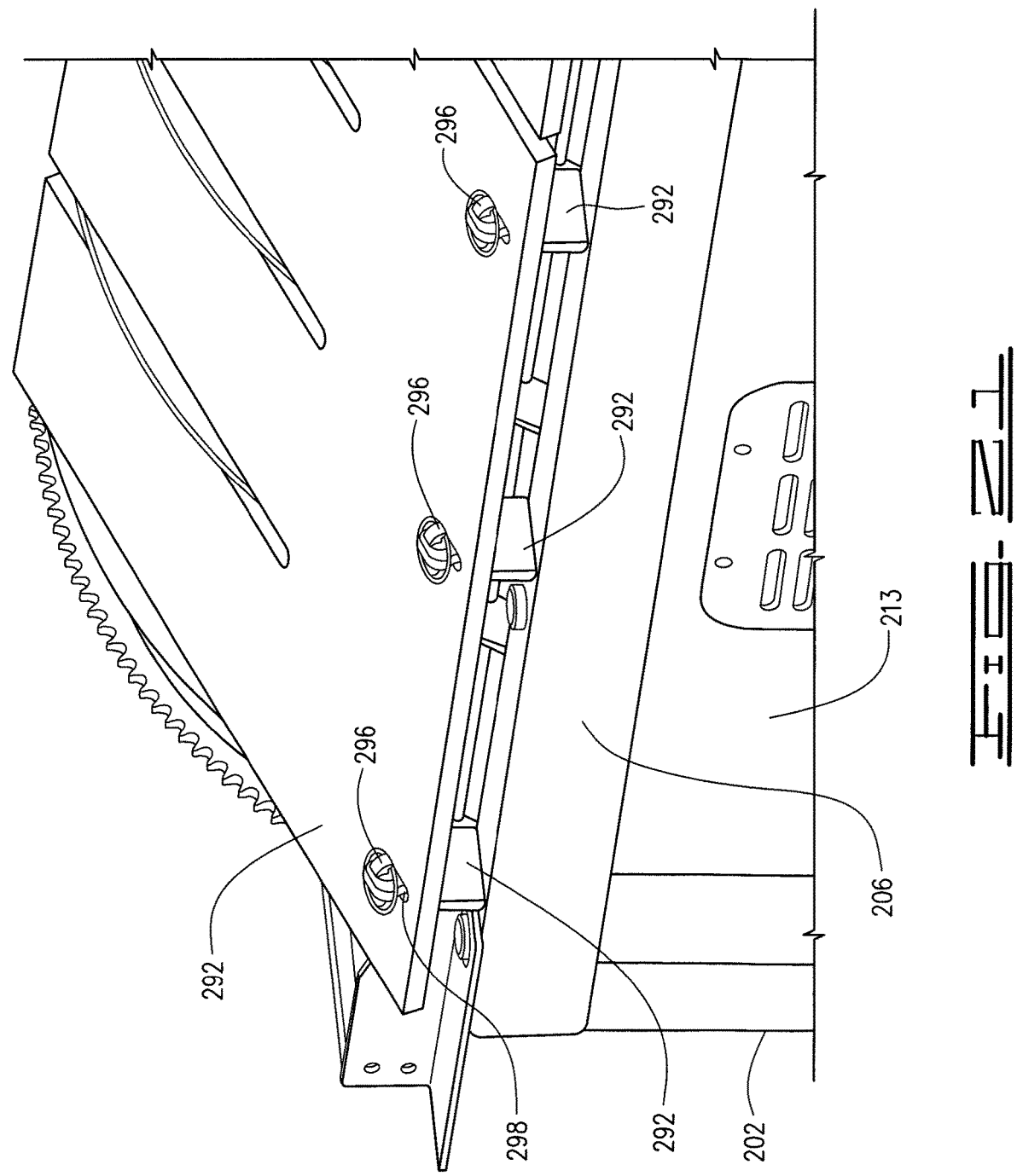
FIG. 21 is a close-up view showing a scraper on the nut sizer.
Figure 22:
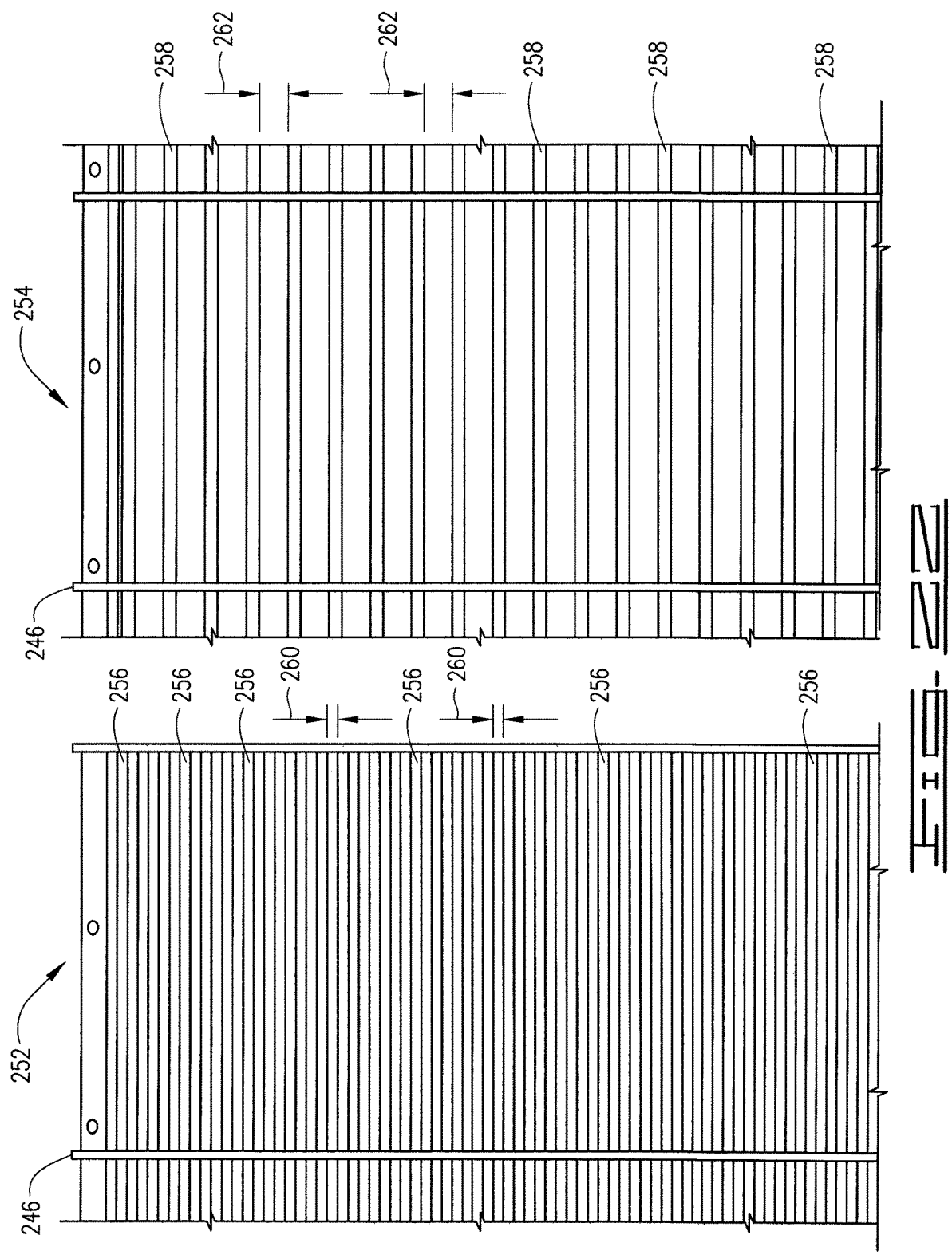
FIG. 22 is a blown-up view of a portion of each of the different segments of the nut sizer cage.
Figure 23:
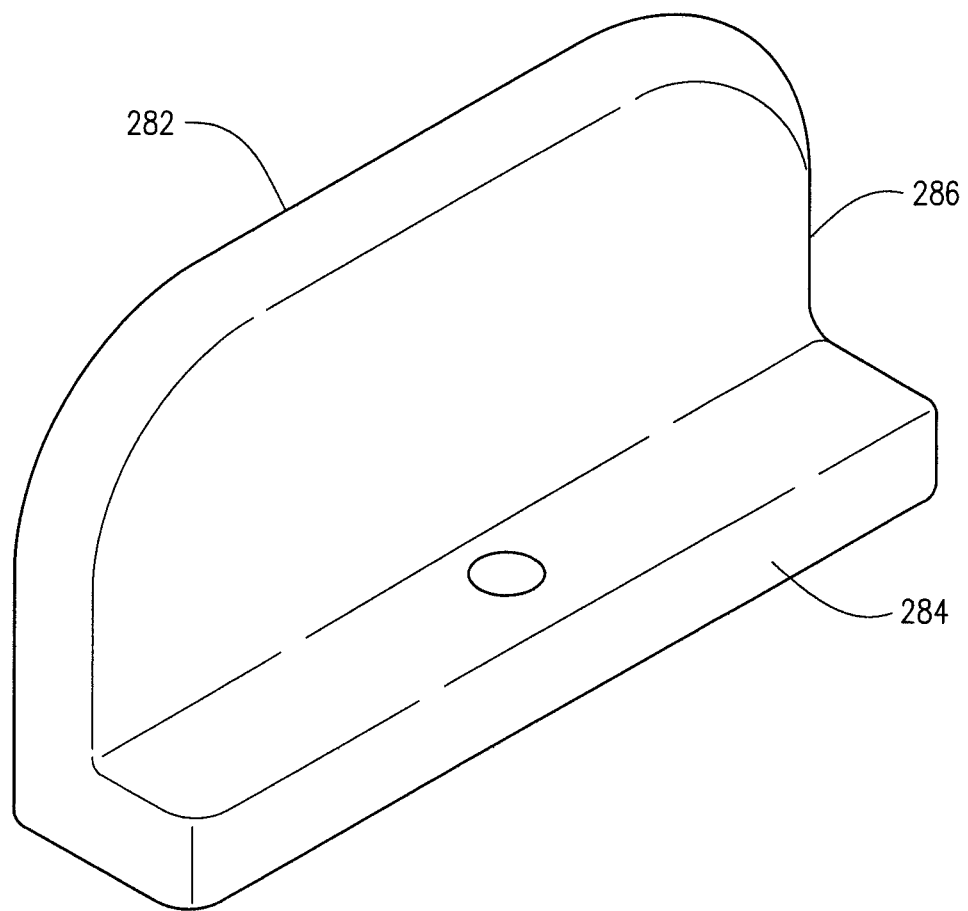
FIG. 23 shows an accelerator plate.

The features of stick remover 20 are better seen in FIGS. 12-14. The endless chain of stick remover 20 is not shown in all views so that other components may be more clearly seen. Stick remover 20 has side panels 100 with a plurality of support bars 102 extending therebetween. Support bars 102 provide a surface for endless sizing chain 104 to move upon. Support bars 102 extend through and are supported by side panels 100. Side panels 100 may comprise first and second side panels 106 and 108. Side panels 100 may have flanges 110 thereon for connecting to vacuum unit 25. As described earlier vacuum unit 25 and stick remover 20 may be connected to each other with bolts or other fasteners known in the art. A flat plate 112 which may be a low friction flat support plate 112 has an upper support surface 114 positioned at or near intake end 116 of stick remover 20. Intake end 116 may generally be referred to and considered as the intake of the system 10. Support plate 112 has a forward edge 118. The forward edge 118 is depicted in phantom lines in FIGS. 8 and 11 to show the location of edge 118 relative to vacuum duct 50. Edge 118 is positioned so that it is generally aligned with rear panel 62 of vacuum duct 50.

Endless sizing chain 104 moves over bars 102 and support plate 112. Sizing chain 104 extends around a rubber coated drum 120 at the forward end 122 of the stick remover 20. Sizing chain 104 extends around a shaft 124 at the rear, or intake end 116 of stick remover 20. Sizing chain 104 has links 126 defining openings 128 to allow nuts to pass therethrough. Sizing chain 104 will move sticks and other debris larger than the openings 128 to debris chute 130 which will deliver such to the debris conveyor 40.

A shaft 124 will rotate about bearings 132 mounted to one of panels 100 in a manner known in the art. A motor 134 will rotate rubber coated drum 120 which will cause linear movement of sizing chain 104. Motor 134 is mounted to a motor mount 136. Harvested nut product along with sticks and other debris will be delivered at intake end 116. Sizing chain 104 will move the harvested nut product along with sticks and other debris toward vacuum unit 25. Light debris will be suctioned from the sizing chain 104. A first product slide 140 will convey nuts and debris that fall through openings 128 after passing over flat support plat 112 to nut delivery conveyor 38. A second product slide 142 is positioned forward of first product slide 140. Second product slide 142 will direct nuts and other material falling thereon through openings 128 into delivery conveyor 38. Thus, all nut product and other material that falls through openings 128 will be collected on delivery conveyor 38, which will convey the nut product and other material to nut sizer 15.

U-shaped channels 150, which may comprise a U-shaped channel 152 near the forward end 122 of the stick remover 20 and a U-shaped channel 154 near the intake end 116, extend through both side panels 100. U-shaped channels 154 are downward facing U-shaped channels. A pair of lengths of square channel 159 which may comprise square channel 160 and square channel 162 extend through stick remover 20, and more specifically extend through U-shaped channels 152 and 154, respectively. Square channels 160 and 162 have a length sufficient to extend through stick remover 20 into a portion of the frame of nut sizer 15. Square channels 160 and 162 may also be referred to as support beams 160 and 162. Support beams 160 and 162, as will be explained in more detail herein below will mount stick remover 20 directly to nut sizer 15. No legs or other structural support is needed for stick remover 20. In the embodiment shown motor mount 136 is mounted to one of support members 156 that extend through U-shaped channel 152 at the forward end 122 of stick remover 20. Motor 134 is mounted thereto to rotate rubber coated drum 120. Motor 134 will be connected to a shaft as known in the art to rotate drum 120.

The modular cleaning system 10 is customizable and reconfigurable, in that as shown in the FIGS. stick remover 20 is mounted so the intake end 116 for the harvested nuts is on the right side 32 of modular cleaning system 10. If space or configuration requirements of a particular building require, motor mount 136 and motor 134 can be removed. Stick remover 20 can be pulled from support members 156, rotated 180°, and slid back on to support members 156. The intake end 116 will then be on left side 30. The motor 134 can be reconnected and stick remover 20 operated as described herein.

Delivery conveyor 38, which may include a cleated conveyor belt 39, is connected by means known in the art to the underside of stick remover 20. In operation delivery conveyor 38 will receive nuts and other material through opening 128 in chain 126 and will deliver them directly into the intake opening for the nut sizer 15. Modular cleaning system 10 does away with the need for legs for stick remover 20 and greatly reduces the height required for use thereof, thus allowing the modular cleaning system 10 to be utilized in much smaller spaces than is currently possible. Typical prior art stick removers are positioned on legs and have a height sufficient for nuts to slide downwardly on a chute and into the open end of a nut sizer. The configuration described herein eliminates the need for the legs and for the additional chute to direct nuts to a sizer.

The details of nut sizer 15 are better seen in FIGS. 15-22. Nut sizer 15 has a rear or intake end 170 and a discharge, or forward end 172. Nut sizer 15 has left side 174, right side 176, top 180 and bottom 182. Nut sizer 15 has an intake opening 184 at the intake end 170 thereof. Nuts are delivered directly in the intake opening 184 from delivery conveyor 38. Nut sizer 15 has a rotatable nut sizing reel 186, which may be referred to as a rotatable nut sizing cage 186, mounted in a nut sizer frame 188. Sizing reel 186, is level, or horizontal from the intake end 170 to the discharge end 172 thereof. Sizing reel 186 thus has a substantially horizontal longitudinal axis 190. Delivery conveyor 38 will extend into intake opening 184 and will deliver nuts into sizing reel 186 therethrough.

Sizing reel 186 is rotated by a drive system 192 at the intake end thereof such that opening 184 is uncovered. Prior art sizing reels generally are driven at the discharge end thereof which makes removal of the sizing reel for any purpose a much more difficult job than with the current configuration described herein. The method of removal of the sizing reel 186 is described below. As described herein rotatable sizer reel 186 does not have any tilt or slant and is horizontal from the intake end 170 to discharge end 172 of nut sizer 15. Nuts delivered to rotatable sizer reel 186 will pass from the intake end 170 toward the discharge end 172 without any tilt or slant to the rotatable sizer cage 186. Frame 188 defines a pair of support openings 194, which may include first and second support openings 196 and 198. Support beams 158 and 160 are received in openings 196 and 198 and extend therein a sufficient distance to securely mount a piece of nut processing equipment, for example stick remover 20, to nut sizer 15.

Nut sizer frame 188 comprises vertical support legs 200, which may include left vertical support legs 202 and right vertical support legs 204. Nut sizer frame 188 further includes left and right upper horizontal beams 206 and 208. Upper horizontal beams 206 and 208 may comprise square channel beams with open ends 196 and 198 at the intake end 170 of nut sizer 25. Nut sizer frame 188 may include additional horizontal beams 207 and 209 below the upper horizontal beams 206 and 208 to provide a strong frame 188. Support beams 158 and 160 will extend a sufficient distance into horizontal beams 206 and 208 to mount stick remover 20 thereto. A threaded securing fastener 210 may be threaded through horizontal beams 206 and 208 and engage beams 158 and 160 to help secure support beams 158 and 160 in place. No other physical support is necessary to mount stick remover 20 to nut sizer 15. As a result, and as explained previously connecting stick remover 20 to nut sizer 15 in this manner provides a modular cleaning system 10 that is configurable to fit a variety of different spaces and sizes in which nut processing may occur. Nut sizer 15 may comprise side panels 213 and 215.

Rotatable sizer reel 186 is rotated by drive system 192. Drive system 192 includes a drive motor 212 with a motor, or drive sprocket 214 rotated by motor 212. A drive chain 216 engages a follower, or tensioning sprocket 218 and is wrapped around a reel sprocket 220. Motor 212 may be connected to a support leg 202 with a bracket 222. Follower sprocket may rotatably connect to bracket 222 and may be movable in slots 224 therein to provide a tension adjustment for chain 216, and also to allow for easy removal of chain 216 and removal of nut sizer reel 186 from nut sizing frame 180.

Reel sprocket 220 may be mounted to a circular support plate, which may be referred to as a circular support ring 226, which is supported on roller bearings 228 and 230. Circular support plate 226 may be referred to as first circular support plate 226. Roller bearings 228 and 230 are connected in a manner known in the art to a bearing mounting plate 232. Bearing mounting plate 232 is fixed by welding or other means to nut sizer frame 188, and in the embodiment shown to the vertical support legs 202 and 204 at the intake end of the nut sizer 15.

A cross beam 234 may be connected to legs 202 and 204 at the intake end 170 of nut sizer 15. Cross beam 234 may be mounted at or near the upper end of the legs 202 and 204 at intake end 170. A support pad 236 which may comprise a plurality of support pads 236 may be held in place by cross beam 220 to apply pressure to the reel sprocket 220. Support pads 236 will aid in holding reel sprocket 220 steady and will prevent or at least limit any horizontal movement of the rotating sizer cage 186. Support pads 236 may be UHMW or other material and will provide a smooth, low friction surface. Bearings may be connected to cross beam 234 in place of support pads 236. The bearings will provide support to reel sprocket 220 and will provide rollers for reel sprocket 220 to move on.

Rotatable sizer cage 186 includes a plurality of support rings 240 which may comprise annular support rings. Annular support rings 240 include a first end annular support ring 242 at the intake end 170 of nut sizer 15 and a second end annular support ring 244 at the discharge end thereof. Circular support plate 226 is connected to first annular support ring 242. The reel sprocket 220 is connected to first end annular support ring 242 by circular support plate 226. Rotation of reel sprocket 220 by motor 212 will therefore rotate rotatable sizer cage 186. Annular support rings 240 also include a plurality of intermediate annular support rings 246. A plurality of longitudinal circular rods 248 are connected by welding or otherwise to annular support rings 240. Nut sizer 15 comprises a plurality of segments 250 and in the current disclosure includes a first or rear segment 252 and a second or forward segment 254. Segments 252 and 254 may be referred to as intake and discharge segments respectively.

For ease of reference, longitudinal circular rods 248 in first segment 252 will be referred to as rods 256 and those in second segment 254 will be referred to as rods 258. Rods 256 and 258 are generally the same size, but as is evident from the figures have different spacings therebetween.

Rods 256 in first segment 252 have a space 260 therebetween and rods 258 in segment section 254 have a space 262 therebetween. Space 262 is larger than space 260, and is generally configured to allow nuts of the desired size to pass therethough into a chute 264 for delivery into further processing or cleaning equipment. Smaller nuts and debris will pass through spaces 260 and into chutes, or slides 266 prior to reaching second section 254. Material passing through spaces 260 will fall into debris conveyor 40, and may be funneled thereto by chutes 266.

Rotating sizer cage 186 includes an additional bearing support plate 270 positioned between the first and second segments 252 and 254. Support plate 270 is connected to the forward most vertical legs 202 and 204. Bearings 272 are attached to support plate 270 and a rotatable support ring 274 is rotatably supported on bearings 272. Rotatable ring 272 may be referred to as a second circular support plate. Rotating ring 274 is bolted to intermediate support rings 246 and specifically is bolted to a support ring 276 at the forward end of the first segment 252 and support ring 278 at the rear end of the second segment 254. As a result second segment 254 can easily be replaced if it is desired to have a segment with a different spacing between the rods to process different sized nuts. Second segment 254 can simply be unbolted from rotating ring 274, and replaced with another segment configured to process different sized nuts than second segment 254. If desired, the nut sizer 15 can be operated without a second segment, and all nuts that pass through to the rear end of first segment 252 can be delivered to other equipment for further processing.

At least one and preferably a plurality of rows of accelerator plates 282 are disposed in an interior of rotating sizer cage 186. Accelerator plates 282 may comprise generally L-shaped angles with a base 284 and a leg 286 extending outwardly therefrom. Accelerator plates will be longitudinally spaced along the length of rotating sizer cage 186. Accelerator plates 282 are connected to longitudinal straps 288 that are welded or otherwise connected to support rings 240. Accelerator plates 282 may be spaced as desired, to generate the desired speed of movement of nuts through nut sizer reel 186. For example, accelerator plates 282 may be positioned and spaced such that there is one accelerator plate 282 between two support rings 176. Sizer cage 186 may include a number of rows, for example two rows of accelerator plates 282 spaced radially 180 degrees apart. Accelerator plates may also be positioned such that rows of accelerator plates 282 in first segment 252 is offset from rows of accelerator plates 282 in second segment 254 of the rotatable sizer cage 186.

Accelerator plates 282 may be formed of steel, plastic or other suitable material. As depicted in the drawings, accelerator plates 282 have rounded corners and edges to limit any cracking of nuts. Accelerator plates 282 will urge nuts from the intake end 170 toward the discharge end 172 of nut sizer 15. The speed of movement of nuts can be adjusted simply by adjusting the angle of the accelerator plates 282, and by positioning the accelerator plates in the rotatable sizer cage to achieve a desired speed of movement of nuts from the intake end 170 toward the discharge end 172 of nut sizer 15.

A scraper assembly 290 which comprises a plurality of scrapers 292 is utilized to dislodge nuts or other material that may become lodged between longitudinal rods 248. Scrapers 292 may be connected to an upper horizontal beam 205 with a connecting plate 294 and a quick release pin 296. Scrapers 292 may have slots to receive connecting plates 294 and quick release pins 296 inserted through openings in the connecting plates 294. By connecting scrapers 292 in this manner, the scrapers 292 are allowed to float and pivot as lodged debris or nuts 292 are in addition, all that is required to remove the scrapers is removing quick release pin 278 from connecting plate 294.

The manner of construction and configuration of nut sizer 15 is such that it can be easily reconfigured to accommodate different sized nuts. The only vertical restraint on cage 186 is chain 216. There are no other structural connections of sizing reel 186 to nut sizer frame 188. In order to remove rotating cage 186 in its entirety, all that it is required is to remove or loosen chain 216. Chain 216 can be removed simply by following sprocket 218 to relieve tension in the chain 216. Once chain 216 is removed, nut size cage 186 can be lifted out and replaced. It may be necessary to remove scrapers 292 as well, which can be achieved simply by removing pins 296. In this way an entirely different rotatable cage with different spaces for the longitudinal rods may be inserted therein. Additionally, second segment 250 may be disconnected from first segment 252 as described above by simply removing the bolts or other fasteners that connect the first and second segments 252 and 254. The second segment 254 can then be simply lifted out of nut sizer frame 188.

All nuts that pass into second segment 254 and through spaces 262 between longitudinal rods 258 are delivered to chute 264 or other delivery equipment and will be further delivered to an elevator or an aspirator for further processing. Product or other debris that passes all the way through rotating cage 186 and is too large to drop through spaces 262 between longitudinal rods 258 in second segment 254 will be delivered to discharge collector 300 and will be directed therefrom on to debris conveyor 40. Debris conveyor 40 may be mounted to frame 188 of nut sizer 15. Debris conveyor 40 will include a conveyor frame connected to nut sizer frame 188 and a conveyor belt. Debris conveyor 40 will extend beyond the discharge end 172 of nut sizer 15 so that material passing through discharge collector 300 may be collected thereon and delivered to a disposal bin or other collection site. Debris conveyor 40 will likewise extend a sufficient length such that it is positioned beneath stick remover 20. Sticks and other debris that are carried by the sizing chain 104 on stick remover 20 will pass around the drum 120 and will be gathered into chute 130 which will deliver the sticks and other debris onto the debris conveyor 40. Thus, any unwanted product, debris or other material that is cleaned from the desired product will be collected on debris conveyor 40 and will be delivered to a desired location. Discharge end 172 may also include an end plate 302. End plate 302 may be connected to upper beams 205 and 208 and intermediate horizontal beams 307 and 309, and along with pads 236 will prevent, or at least limit horizontal movement of nut sizer cage 186.

In operation a nut product stream will be delivered to the intake end 116 of the stick remover 20. Sizing chain 104 will be moved linearly by rotating drum 120 such that the desired nuts along with grass, leaves, hulls and other debris will move along with sizing chain 104. The nuts will pass along the top surface 114 of plate 112 and light debris will be suctioned from the nut product stream by vacuum unit 25. The amount of vacuum can be changed by altering the speed at which a fan rotates, and by raising/lowering the louver 66 which will change the spacing between the louver 66 and the support plate 112. Nuts and debris small enough to pass through openings 128 in endless chain 104 will pass down product slide 140 or slide 142 onto a conveyor 30 that will deliver the nuts and other material collected thereon into nut sizer 15 and specifically into rotating sizer cage 186 at the intake end 170 thereof. Vacuum unit 25 has a pivotable vacuum duct 50 that will pivot such that large objects may pass therethrough without clogging or blocking and preventing nuts from being delivered onto conveyor 40. Sticks and other unwanted debris that are not sucked by vacuum unit 25 and do not pass through openings 128 will be carried by chain 104 and dropped on debris chute 130 and delivered to debris conveyor 40.

Nuts and other material received in intake end 170 will be tumbled and rotated by rotating sizer case 186 to eliminate dirt, sand, small rocks and other debris from the desired nut product. The spacing 262 between longitudinal rods 258 in second segment 254 is greater than the space 260 in first segment 252. Nuts and small debris smaller than the desired nut size will pass through spaces 260 in first segment 252. Nuts and debris in the nut product stream that do not pass through spaces 260 will be moved in to second segment 254 by accelerator plates 262. Nuts in the nut product stream that pass into second segment 254 will continue to be rotated and tumbled. Nuts of the desired size (i.e., nuts small enough to pass through spaces 262 between rods 258) may be directed with a chute 264, or other conveyance, to additional processing equipment such as for example an elevator or aspirator. Nuts too large to pass through spaces 262, along with any debris carried therewith will be directed by accelerator plates 282 through discharge end 172 and into a discharge collector 300 which will direct all material delivered thereto into debris conveyor 40.

The current disclosure therefore describes a modular nut cleaning system or plant 10 that will fit in different sizes and configurations of spaces and that can be reconfigured to fit the space limitations of different facilities. The modular nut cleaning system 10 includes a stick remover 20 that is mounted to a nut sizer 15. A vacuum unit 25 is mounted to stick remover 20. Nut product along with other debris gathered during the harvest is provided to stick remover 20. The vacuum unit 25 will suction away light debris including sticks and other light materials, and nut product along with some other heavier debris will fall onto a product delivery conveyor 38 positioned beneath stick remover 20. That nut product will be delivered directly into an opening in the receiving or entry end of nut sizer 15. Nut sizer 15 comprises a rotating sizer cage 186 with spaced longitudinal rods 248. The rotation of the rotating cage 186 will tumble nut product to eliminate dirt, sand, small rocks and other debris from the desired nut product. The nut sizer 15 will likewise sort nuts by size and/or condition. The rotating sizer cage 186 is generally a horizontally mounted rotating cylindrical cage.

Longitudinal rods 248 are equally spaced around the perimeter in sections or segments of the rotating sizer cage 186. For example, the first segment 252 may have rods 256 that are spaced a first distance 260 while a second segment 254 has rods 258 that are spaced a second greater distance 262. Small nuts and other debris will fall through the spaces 260 in the first segment 256. Accelerator plates 282 mounted in the rotatable sizer cage 186 will move nuts from the entry end 170 thereof toward discharge end 172. Nuts that do not fall through spaces 258 will pass into second section 254. Because the space 262 between longitudinal rods 256 in the second segment 254 are greater than spaces 260, nuts of the desired size will fall therethrough while any larger product or other debris will ultimately be delivered to the discharge end to a discharge collector. The discharge collector 300 will deliver nuts and unwanted debris onto debris conveyor 40. The debris conveyor 40 will likewise collect debris and trash from the stick remover 20. Thus, debris conveyor 40 will extend from stick remover 20 all the way to the discharge end of the rotating sizer cage 186 so that any debris that is cleaned from the nut product stream will be received on the debris conveyor 40.

The modular nut cleaning system is reconfigurable in that stick remover 20 may be mounted to the nut sizer 15 such that intake end 10 of the modular cleaning system is positioned at either the left or right side of the nut sizer 15. In this way the modular cleaning system may be configured to adapt to different sizes and spaces in which processing is desired. The modular cleaning system can likewise be easily configured to process different nut sizes. Rotatable sizer cage 188 is held in place in the horizontal direction at the intake end 170 by support pads 236 and at discharge end 172 by end plate 302. There are no fasteners or other structural connectors used to prevent the rotating sizer cage from moving upwardly. In other words, no fasteners or other structural connectors are used. The rotatable sizing cage is held in place vertically only by the chain 216. Thus, to remove rotatable sizer wheel 186, one need simply loosen, or remove chain 216, and lift rotatable sizer wheel 186 upwardly. In some embodiments scrapers 292 will have to be removed to provide clearance to remove the nut sizer cage 186, but as explained scrapers 292 do not connect the nut sizer reel 186 to nut sizer frame 188. Scrapers 192 are not structural connectors and do not restrain the nut sizer cage. In other words, the only external structural vertical restraint on the nut sizer cage 186 is the chain 216. As is understood, the weight of the nut sizer cage 186 keeps the nut sizer cage 186 from moving vertically, but the only restraint that must be removed to lift the nut sizer cage 186 is the chain 186. A sizer cage with different rod spacing can be lowered and supported by the first and second circular support plates as described herein.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A modular nut cleaning plant comprising:
   a nut sizer having an open intake end and a discharge end, the nut sizer comprising a nut sizer frame and rotatable nut sizer cage rotatably mounted in the nut sizer frame the nut sizer cage comprising longitudinally extending spaced apart rods to allow nuts of a desired size to pass therebetween; and
   a stick remover having a receiving end and a discharge end mounted to the nut sizer frame, the stick remover comprising:
      a movable endless chain defining a plurality of openings to allow nuts to pass therethrough; and
      a delivery conveyor positioned to receive nuts and other debris that pass through the openings in the endless chain, wherein the delivery conveyor delivers nuts and debris that pass through the endless chain directly into the open intake of the nut sizer, the nut sizer frame having openings positioned to receive support beams connected to and extending from the stick remover to mount the stick remover to the nut sizer, the stick remover being spaced upwardly from and not contacting a floor surface on which the nut sizer is placed when the stick remover is mounted to the nut sizer frame.

2. The modular nut cleaning plant of claim 1 further comprising:
a vacuum unit mounted to the stick remover and positioned to pull loose debris from the nut product stream as it passes under the vacuum unit on the endless chain.

3. The modular nut cleaning plant of claim 1, the support beams extending from the stick remover in a direction perpendicular to the direction of movement of the movable endless chain connecting the stick remover to the nut sizer.

4. The modular nut cleaning plant of claim 3, the nut sizer frame comprising first and second spaced apart horizontal beams having open ends, wherein the support beams extend from the stick remover into the open ends of the spaced apart horizontal beams.

5. The modular nut cleaning plant of claim 1, the modular nut cleaning plant being reconfigurable such that the receiving end of the stick remover may be positioned on either a right or left side of the nut sizer.

6. A modular nut cleaning plant comprising:
a nut sizer comprising a rotating nut sizer cage mounted in a nut sizer frame, the nut sizer cage having an open intake end for receiving a nut product stream, the rotating nut sizer cage comprising a plurality of spaced apart sizer rods between which nuts received in the nut sizer cage will fall; and
a stick remover with a nut product stream receiving end connected to the nut sizer frame wherein the stick remover comprises an endless chain that moves the nut product stream from the receiving end thereof toward a discharge end of the stick remover;
a delivery conveyor positioned to collect nuts from the nut product stream from the stick remover and to deliver the nuts along with other debris in the nut product stream into the open intake end of the rotating nut sizer cage, the stick remover being reversibly positionable on the nut sizer frame such that the nut receiving end of the stick remover may be positioned on a right or left side of the nut sizer, the delivery conveyor positioned between upper and lower runs of the endless chain.

7. The modular nut cleaning plant of claim 6 further comprising:
a vacuum unit connected to the stick remover, wherein the stick remover conveys the nut product stream through the vacuum unit.

8. The modular nut cleaning plant of claim 6:
the stick remover being mounted to the nut sizer with a pair of support beams extending from the stick remover and into a pair of openings in the nut sizer frame.

9. The modular nut cleaning plant of claim 8 wherein the openings in the nut sizer frame are defined by a pair of spaced apart hollow horizontal beams for receiving the pair of support beams extending from the stick remover.

10. The modular nut cleaning plant of claim 6, further comprising:
a debris conveyor mounted to the nut sizer frame beneath the rotating nut sizer cage and positioned to collect undesirable debris that passes out of the nut sizer cage.

11. The modular nut cleaning plant of claim 6, wherein the nut sizer cage comprises:
a rear sizer section with a plurality of the spaced apart sizer rods defining first spaces therebetween configured to permit nuts smaller than a desired nut size to pass therethrough and prevent nuts of the desired nut size from passing therethrough; and
a forward sizer section detachably connected to the rear sizer section, the forward sizer section having a plurality of the spaced apart sizer rods with second spaces therebetween configured to permit nuts of the desired size to pass therethrough and to prevent nuts larger than the desired nut size from passing therethrough.

12. A modular nut cleaning apparatus comprising:
a nut sizer with an open intake end configured to receive nuts from a nut product stream, the nut sizer comprising a rotatable nut sizer cage with a plurality of longitudinally extending nut sizer rods with spaces therebetween through which nuts from the nut product stream will pass;
a stick remover with a receiving end for receiving the nut product stream mounted to the nut sizer, the stick remover comprising,
a moving endless chain to move sticks toward a discharge end thereof, the endless chain defining openings through which nuts in the nut product stream fall; and
a support surface at the receiving end of the stick remover along which the nut product stream travels, the endless chain configured to deliver sticks and other debris to a debris conveyor; and
a delivery conveyor positioned to receive the nuts that pass through the openings in the endless chain of the stick remover and to convey the nut product stream from the stick remover to the open intake end of the nut sizer; and
a vacuum unit mounted to the stick remover, wherein the stick remover conveys the nut product stream through the vacuum unit prior to nuts from the nut product stream passing through the endless chain.

13. The modular nut cleaning apparatus of claim 12 wherein the nut sizer comprises:
a nut sizer frame;
the rotatable nut sizer cage mounted to the nut sizer frame; and
a plurality of accelerator plates configured to move nuts in the nut product stream in the nut sizer cage from the intake end toward the discharge end thereof.

14. The modular nut cleaning apparatus of claim 12, the vacuum unit positioned on the stick remover between the receiving end and the exit end thereof.

15. The modular nut cleaning apparatus of claim 13, further comprising:
a motor mounted to the nut sizer frame;
a reel sprocket connected to the rotatable nut sizer cage at the intake end of the nut sizer;
a drive sprocket configured to be driven by the motor; and
a drive chain engaging the reel sprocket and the drive sprocket.

16. A modular nut cleaning plant comprising:
a nut sizer having an open intake end and a discharge end, the nut sizer comprising a nut sizer frame and rotatable nut sizer cage rotatably mounted in the nut sizer frame, the nut sizer cage comprising longitudinally extending spaced apart rods to allow nuts of a desired size to pass therebetween;
a stick remover having a receiving end and a discharge end mounted to the nut sizer frame, the stick remover comprising:
a movable endless chain defining a plurality of openings to allow nuts to pass therethrough; and a delivery conveyor positioned to receive nuts and other debris that pass through the openings in the endless chain, wherein the delivery conveyor delivers nuts and debris that pass through the endless chain directly into the open intake of the nut sizer; and a debris conveyor positioned beneath the nut sizer configured to collect debris passing out of the nut sizer through the longitudinally extending spaced apart rods in first and second sections thereof as the nut product stream moves from the intake end of the nut sizer toward the discharge end of the nut sizer, the spaces between the longitudinally extending spaced apart rods in the second section being greater than the spaces between the rods in the first section.

* * * * *